(12) United States Patent
Lee et al.

(10) Patent No.: US 11,617,146 B2
(45) Date of Patent: Mar. 28, 2023

(54) METHOD AND APPARATUS FOR REGISTERING WITH NETWORK SLICE IN WIRELESS COMMUNICATION SYSTEM

(71) Applicant: Samsung Electronics Co., Ltd., Suwon-si (KR)

(72) Inventors: Hoyeon Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 17/247,995

(22) Filed: Jan. 4, 2021

(65) Prior Publication Data
US 2021/0212010 A1    Jul. 8, 2021

(30) Foreign Application Priority Data

Jan. 3, 2020  (KR) .................. 10-2020-0001016
May 20, 2020  (KR) .................. 10-2020-0060626

(51) Int. Cl.
*H04W 4/00*     (2018.01)
*H04W 60/00*    (2009.01)
(Continued)

(52) U.S. Cl.
CPC .......... *H04W 60/005* (2013.01); *H04W 8/02* (2013.01); *H04W 48/16* (2013.01)

(58) Field of Classification Search
CPC ... H04W 60/00; H04W 60/005; H04W 60/04; H04W 8/02; H04W 8/26; H04W 48/16; H04W 12/06

(Continued)

(56) References Cited

U.S. PATENT DOCUMENTS

2018/0324663 A1    11/2018  Park et al.
2019/0029065 A1    1/2019   Park et al.
(Continued)

FOREIGN PATENT DOCUMENTS

WO    2019032972 A1    2/2019
WO    2019076681 A1    4/2019

OTHER PUBLICATIONS

International Search Report and Written Opinion of the International Searching Authority dated Apr. 5, 2021 in connection with International Application No. PCT/KR2020/019417, 9 pages.

*Primary Examiner* — Temica M Beamer

(57) ABSTRACT

A method of a network function (NF) entity performing communication in a wireless communication system includes: in case that a first registration request of a user equipment (UE) for a slice is received at an access and mobility function (AMF) entity through a first network, receiving a first slice availability request message for the slice from the AMF entity; determining whether the slice is available for the UE, based on a network slice policy; and transmitting, to the AMF entity, a response message including information regarding slice availability of the UE according to the first registration request, wherein in case that a second registration request of the UE for the slice is received at the AMF entity through a second network, slice availability of the UE according to the second registration request is determined based on at least one of the network slice policy or the information regarding the slice availability of the UE according to the first registration request.

18 Claims, 11 Drawing Sheets

(51) Int. Cl.
 *H04W 48/16* (2009.01)
 *H04W 8/02* (2009.01)
(58) Field of Classification Search
 USPC ...................................................... 455/435.1
 See application file for complete search history.

(56) References Cited

U.S. PATENT DOCUMENTS

2019/0037385 A1\* 1/2019 Li ..................... H04W 36/0016
2019/0335392 A1  10/2019 Qiao et al.
2019/0357129 A1\* 11/2019 Park ..................... H04W 60/00

\* cited by examiner

METHOD AND APPARATUS FOR REGISTERING WITH NETWORK SLICE IN WIRELESS COMMUNICATION SYSTEM

CROSS-REFERENCE TO RELATED APPLICATIONS

This application is based on and claims priority under 35 U.S.C. § 119 to Korean Patent Application No. 10-2020-0001016 filed on Jan. 3, 2020 and Korean Patent Application No. 10-2020-0060626 filed on May 20, 2020 in the Korean Intellectual Property Office, the disclosures of which are herein incorporated by reference in their entirety.

BACKGROUND

1. Field

The disclosure relates to a method and apparatus for registering with a network slice in a wireless communication system, and more particularly, to a technology for managing a user equipment registered with a network slice in a wireless communication system.

2. Description of Related Art

To meet the demand with respect to ever-increasing wireless data traffic since the commercialization of the 4th generation (4G) communication system, there have been efforts to develop an advanced 5th generation (5G) or pre-5G communication system. For this reason, the 5G or pre-5G communication system is also called a beyond 4th-generation (4G) network communication system or post long term evolution (LTE) system. Implementation of the 5G communication system using ultra-frequency (millimeter wave (mmWave)) bands, e.g., 60 giga hertz (GHz) bands, is considered to attain higher data transfer rates. To reduce propagation loss of radio waves and increase a transmission range of radio waves in the ultra-frequency bands, beamforming, massive multiple-input multiple-output (massive MIMO), full dimensional MIMO (FD-MIMO), array antenna, analog beamforming, and large-scale antenna techniques are under discussion. To improve system networks, technologies for advanced small cells, cloud radio access networks (RANs), ultra-dense networks, device to device (D2D) communication, wireless backhaul, moving networks, cooperative communication, coordinated multi-points (COMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, is combined with the IoT technology, have also emerged. To implement IoT, various technologies, such as a sensing technology, a wired/wireless communication and network infrastructure, a service interfacing technology, and a security technology are required, and recently, even technologies for sensor network, machine to machine (M2M) communication, machine type communication (MTC) for connection between things are being studied. Such an IoT environment may provide intelligent Internet technology (IT) services that create new values to human lives by collecting and analyzing data generated from things connected. IoT may be applied to a variety of areas, such as smart home, smart buildings, smart cities, smart cars or connected cars, smart grid, health care, smart home appliances and advanced medical services through convergence and combination between existing Information Technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be viewed as an example of convergence of 5G and IoT technologies.

With the development of the aforementioned technologies and wireless communication systems, it is possible to provide various services, and there is a need for a method to provide the services smoothly. A network slicing technology in particular has been introduced to support various services in such various network architectures.

SUMMARY

The disclosure provides a technology to manage a user equipment (UE) registered with a network slice in a core network.

Additional aspects will be set forth in part in the description which follows and, in part, will be apparent from the description, or may be learned by practice of the presented embodiments of the disclosure.

According to an embodiment of the disclosure, a method of a network function (NF) entity performing communication in a wireless communication system includes: in case that a first registration request of a user equipment (UE) for a slice is received at an access and mobility function (AMF) entity through a first network, receiving a first slice availability request message for the slice from the AMF entity; determining whether the slice is available for the UE, based on a network slice policy; and transmitting, to the AMF entity, a response message including information regarding slice availability of the UE according to the first registration request, wherein in case that a second registration request of the UE for the slice is received at the AMF entity through a second network, slice availability of the UE according to the second registration request is determined based on at least one of the network slice policy or the information regarding the slice availability of the UE according to the first registration request.

The method may further include: in case that the second registration request of the UE for the slice is received at the AMF entity through the second network, receiving a second slice availability request message for the slice from the AMF entity; and determining the slice availability of the UE according to the second registration request, based on a maximum number of UEs accessing the slice included in the network slice policy.

The slice availability of the UE according to the second registration request may be determined based on at least one of the network slice policy or the information regarding the slice availability of the UE according to the first registration request at the AMF entity.

According to an embodiment of the disclosure, a method of a user equipment (UE) performing communication in a wireless communication system includes: transmitting a first registration request of the UE for a slice to an access and mobility function (AMF) entity through a first network; receiving a first response message including information regarding slice availability of the UE according to the first registration request, wherein the slice availability of the UE according to the first registration request is determined based on a network slice policy, at a network function (NF) entity in which first slice availability request message is received from the AMF; transmitting a second registration request of the UE for the slice to the AMF entity through a second network; and receiving a second response message including information regarding slice availability of the UE according to the second registration request, wherein the slice availability of the UE according to the second registration request is determined based on at least one of the network slice policy or the information regarding the slice availability of the UE according to the first registration request.

The slice availability of the UE according to the second registration request may be determined at the NF entity based on a maximum number of UEs accessing the slice included in the network slice policy.

The slice availability of the UE according to the second registration request may be determined based on at least one of the network slice policy or the information regarding the slice availability of the UE according to the first registration request at the AMF.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Embodiments of the disclosure provide a method and apparatus for supporting various services in a wireless communication system. Specifically, the disclosure provides a technology to manage registration of a UE which intends to use a network slice to support various services in a wireless communication system.

Network slicing is a technology that logically configures a network into a set of network functions (NFs) to each support a certain service and separates a network slice from others. A UE may access two or more slices to receive various services.

Herein, terms to identify access nodes, terms to refer to network entities or NFs, terms to refer to messages, terms to refer to interfaces between network entities, terms to refer to various types of identification information, etc., are examples for convenience of explanation. Accordingly, the disclosure is not limited to the terms as herein used, and may use different terms to refer to the items having the same meaning in a technological sense.

For convenience of explanation, the disclosure will hereinafter use terms and definitions defined by the third generation partnership project (3GPP) long term evolution (LTE) and 5th generation (5G) standards. The disclosure is not, however, limited to the terms and definitions, and may equally apply to any systems that conform to other standards.

In the following description, objects that exchange information for access control and status management will be called by the names of NFs (e.g., access and mobility function (AMF), session management function (SMF), network slice selection function (NSSF), etc.) for convenience of explanation. Embodiments of the disclosure may, however, be equally applied to an occasion when the NFs are implemented as instances, e.g., an AMF instance, an SMF instance, an NSSF instance, etc.

Figure 1:
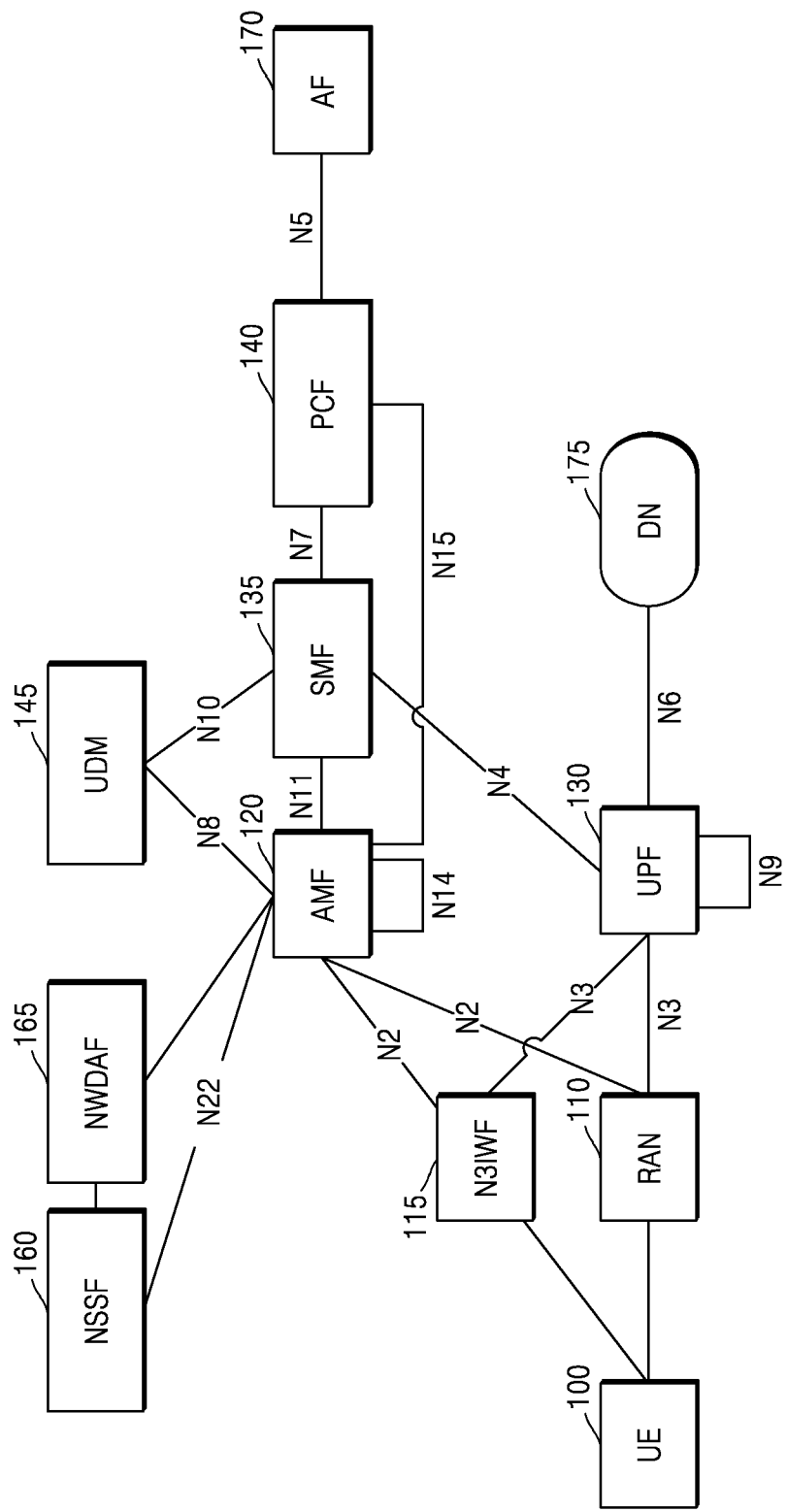
FIG. 1 shows an architecture of a $5^{th}$ generation system (5GS), according to an embodiment of the disclosure.

FIG. 1 shows an architecture of a 5$^{th}$ generation system (5GS), according to an embodiment of the disclosure.

Referring to FIG. 1, a 5G core network may include an AMF 120, a user plane function (UPF) 130, an SMF 135, a policy control function (PCF) 140, a user data management function (UDM) 145, an NSSF 160, a network data analytics function (NWDAF) 165, a non-3GPP (or N3GPP) access network 115, etc.

A UE 100 may access the 5G core network through a 3GPP radio access network (RAN) 110 or the non-3GPP access network 115. The UE 100 may be connected through the RAN 110 to the AMF 120 with an N2 interface and to the UPF 130 with an N3 interface. The RAN 110 may also be referred to as a base station (BS), an access point (AP), an eNodeB (eNB), a 5G node, a gNodeB (gNB), or any other terms having equal technical meaning.

The non-3GPP access network 115 is an NF that serves as termination of the N2 interface and the N3 interface for the UE 100 connected via an access network not defined by 3GPP (non-3GPP access network), e.g., wireless fidelity (Wi-Fi). For example, for the non-3GPP access network 115, a non-3GPP interworking function (N3IWF), a trusted N3GPP gateway function (TNGF), a wireline access gateway function (W-AGF), etc., may be used. In the disclosure, the N3IWF will be used for the non-3GPP access network 115, but the N3IWF is merely an example and the non-3GPP access network 115 is not limited to the N3IWF. The N3IWF 115 may handle N2 control plane signaling and N3 user plane packets. The UE 100 connected to the N3IWF 115 through a non-3PP access network may be connected through the N3IWF 115 to the AMF 120 with the N2 interface and to the UPF 130 with the N3 interface.

The AMF 120 is an NF that manages access to a wireless network and mobility for a UE. The SMF 135 is an NF that manages a session for a UE, and session information may include quality of service (QoS) information, charging information, and information about packet processing. The UPF 130 is an NF that handles user plane traffic under the control of the SMF 135. The PCF 140 is an NF that manages an operator policy to provide services in the wireless communication system. The UDM 145 is an NF that stores and manages UE subscription data. A unified data repository (UDR) is an NF that stores and manages data. The UDR may store the UE subscription data and provide the UE subscription data to the UDM 145. The UDR may further store the operator policy information and provide the operator policy information to the PCF 140.

The NWDAF 165 is an NF that provides analysis information for operation of the 5G system. The NWDAF 165 may collect data from the other NFs or operations, administration and maintenance (OAM), included in the 5G system, analyze the collected data, and provide a result of the analyzing to the other NFs.

Entities that exchange information for access control and status management will now be collectively called 'NFs' for convenience of explanation. In the disclosure, the term NF may be interchangeably used with NF entity, which may be implemented as an instance, e.g., an AMF instance, an SMF instance, an NSSF instance, or the like, in embodiments of the disclosure.

The instance may refer to an executable state of a function of an NF that exists in the form of software codes with the use of physical and/or logical resources allocated from a computing system (e.g., a certain computing system present in the core network) to perform the function of the NF. That is, the AMF instance, the SMF instance, and the NSSF instance may each refer to a state of being allocated a physical and/or logical resource for AMS, SMF, or NSSF operation from a certain computing system present in the core network and able to use the resource. As a result, a physical AMF, SMF, or NSSF entity and an AMF instance, SMF instance, or NSSF instance, which is allocated, from a certain computing system present in a network, a physical and/or logical resource, and uses the resource for AMF, SMF, or NSSF operation, may perform the same operation. Accordingly, in embodiments of the disclosure, an NF (e.g., AMF, SMF, UPF, NSSF, NRF, SCP, or the like) may be replaced by an NF instance, and vice versa. Likewise, in embodiments of the disclosure, the term network slice may be interchangeably used with network slice instance.

In an embodiment of the disclosure, a single network slice in a 5G system defined by the 3GPP may be referred to as single network slice selection assistance information (S-NSSAI). The S-NSSAI may include a slice/service type (SST) value and a slice differentiator (SD) value. An SST may indicate characteristics of a service supported by a slice (e.g., enhanced mobile broadband (eMBB), Internet of things (IoT), ultra reliable low latency communication (URLLC), vehicle to everything (V2X), or the like). The SD value may be a value used for an extra identifier for a certain service called by the SST.

NSSAI may include one or more pieces of S-NSSAI. For example, the NSSAI may include, but not exclusively, Configured NSSAI stored in the UE, Requested NSSAI requested by the UE, Allowed NSSAI allowed to be used by a UE determined by an NF (e.g., an AMF, an NSSF, or the like) in a 5GCS, UE subscribed NSSAI, etc.

The UE 100 may be connected both to the 3GPP access network and the non-3GPP access network to register with the 5G system. Specifically, the UE 100 may access the 3GPP RAN 110 to perform a registration procedure with the AMF 120. During the registration procedure, the AMF 120 may determine an allowed slice (Allowed NSSAI) available to the UE 100 that has access to the 3GPP RAN 110 and allocate the slice to the UE 100. This is called a first allowed slice. The UE 100 may access the N3IWF 115 to perform a registration procedure with the AMF 120. During the registration procedure, the AMF 120 may determine an allowed slice (Allowed NSSAI) available to the UE 100 that has access to the N3IWF 115 and allocate the slice to the UE 100. This is called a second allowed slice. The first and second allowed slices may include the same S-NSSAI or different S-NSSAI.

Embodiment 1

A mobile communication operator may define a size of a network resource that may be provided for each network slice. In the disclosure, this may be referred to as a network slice policy or slice policy. The slice policy information may include at least one of the followings:

S-NSSAI maximum number of UEs maximum UE counting method

In an embodiment of the disclosure, the maximum number of UEs included in the slice policy information may indicate the number of UEs allowed to use the S-NSSAI. The UE 100 may send information about a network slice to be used (Requested NSSAI) to the AMF 120 during the registration procedure (or attach procedure), and the AMF 120 may determine a network slice available to the UE 100 and provide the network slice information (Allowed NSSAI) to the UE 100. In an embodiment of the disclosure, the maximum number of UEs may indicate the maximum number of UEs that receive Allowed NSSAI including the S-NSSAI during the registration procedure. For example, when the maximum number of UEs for an eMBB slice is 100,000, the 5G core network (or at least one network function in the 5G core network) may transmit Allowed NSSAI including S-NSSAI indicating the eMBB slice to up to 100,000 UEs.

In an embodiment of the disclosure, the maximum UE counting method included in the slice policy information is a method of counting UEs, each of which registers with the 5G system through both the 3GPP access network and the non-3GPP access network and is allowed for the S-NSSAI both in the 3GPP access network and the non-3GPP access network. For example, when the UE counting method is on a registration basis, the number of registrations through the 3GPP access network and non-3GPP access network may be computed to be two. In this case, it may be more predictable how many network resources are to be allocated for the network slice, and based on which, the mobile communication operator may make a network deployment plan. In another example, when the number of registrations is determined on a UE basis, the number of registrations through each of the 3GPP access network and non-3GPP access network may be computed to be one.

In an embodiment of the disclosure, the 5G core network (or at least one network function in the 5G core network) may store and manage the slice policy information in an NF. For example, of the NFs of the 5G core network, the PCF 140, the NSSF 160, or the UDM 145 may manage the slice policy information. The slice policy information stored in the NF may be determined by a policy of the mobile communication operator. The mobile communication operator may store and update the slice policy information in the NF in an OAM method.

In an embodiment of the disclosure, an NF in the 5G core network (or at least one network function in the 5G core network) may obtain slice policy information from another NF in the 5G core network. For example, of the NFs of the 5G core network, the AMF 120 may obtain the slice policy information from the PCF 140, the NSSF 160, the NWDAF 165 or the UDM 145.

In an embodiment of the disclosure, when the UE 100 registers with the 5G system through both the 3GPP access network and the non-3GPP access network, and is allowed for the S-NSSAI in both the 3GPP access network and the non-3GPP access network, the 5G system may count the number of UEs based on the maximum UE counting method included in the slice policy information. For example, when the UE counting method is on a registration basis, the number of registrations through the 3GPP access network and non-3GPP access network may compute to be two. In this case, the 5G system may allow registration through only one of the 3GPP access network and the non-3GPP access network based on the priorities of the 3GPP access network and the non-3GPP access network.

In another example, when the UE 100 registers with the 5G system through both the 3GPP access network and the non-3GPP access network, and is allowed for the S-NSSAI in both the 3GPP access network and the non-3GPP access network, the 5G system may count the number of registrations as one in a UE based UE counting method.

Embodiment 2

Figure 2:
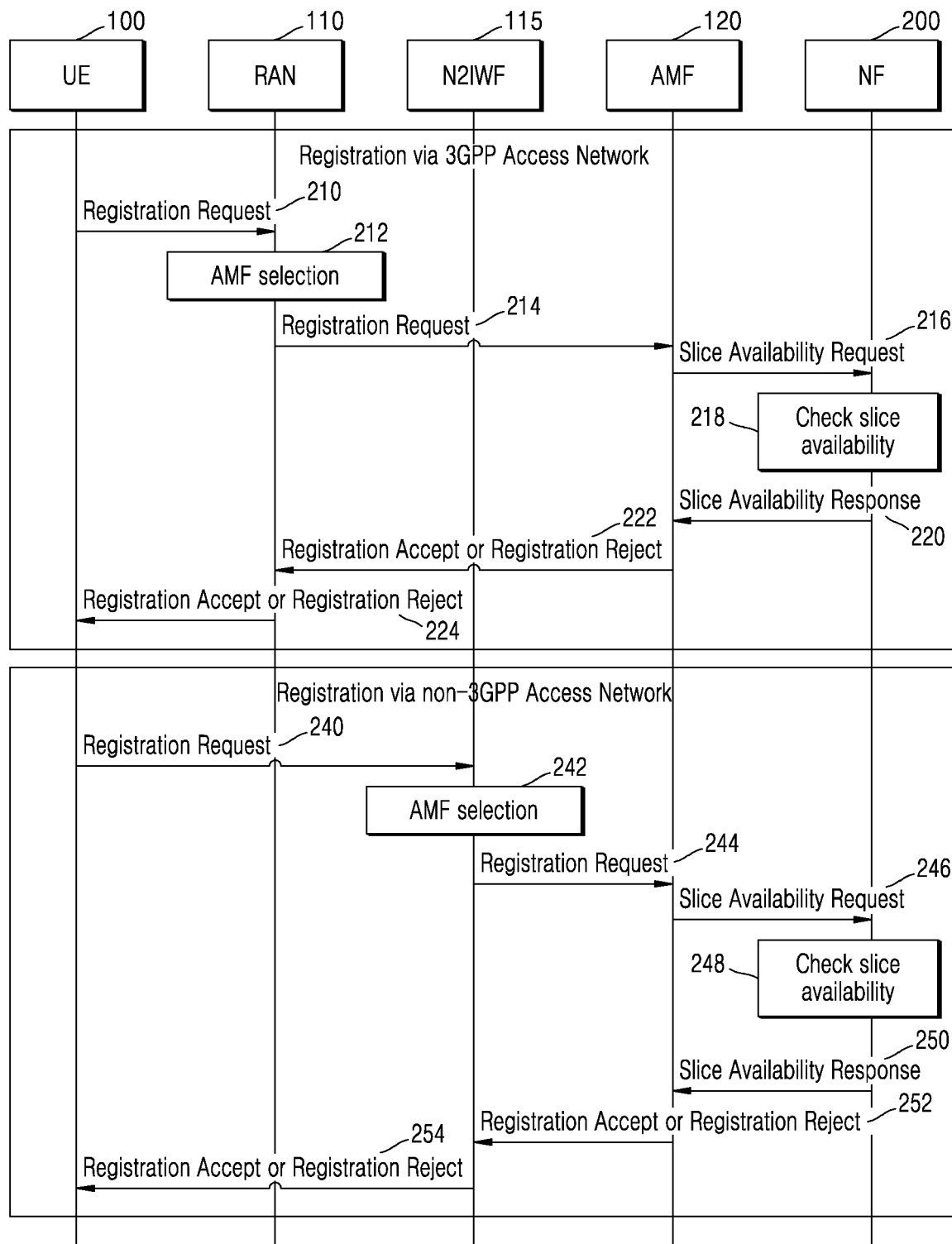
FIG. 2 is a sequence diagram illustrating a user equipment (UE) registration procedure, according to an embodiment of the disclosure.

FIG. 2 is a sequence diagram illustrating a UE registration procedure, according to an embodiment of the disclosure.

Referring to FIG. 2, the UE 100 may access the RAN 110 and the N3IWF 115 to perform a registration procedure with the AMF 120.

In operation 210, the UE 100 may access the RAN 110 and transmit a registration request message. The registration request message may include information about a requested slice (Requested NSSAI, e.g., S-NSSAI A) that the UE 100 tries to use.

The registration request message transmitted by the UE 100 may include information about a preferred access type. The preferred access type may indicate a type of an access network preferred by the UE 100 (e.g., the 3GPP access network, the non-3GPP access network, or the like) for each S-NSSAI requested by the UE 100.

For example, the preferred access type may be set up in association with the RAN 110 currently accessed by the UE 100. In this case, the UE 100 may set an access network type supported by the RAN 110 currently accessed by the UE 100 to be the preferred access type.

In another example, the preferred access type may be set up without regard to the RAN 110 currently accessed by the UE 100. In this case, the UE 100 may set an access network type that is supported or not supported by the RAN 110 currently accessed by the UE 100 to be the preferred access type.

In operation 212, the RAN 110 that has received the registration request message may select the AMF 120 to forward the registration request to, based on the Requested NSSAI received from the UE 100. For example, the AMF 120 selected by the RAN 110 is able to support the Requested NSSAI.

In operation 214, the RAN 110 may forward the registration request message to the AMF 120 selected in the operation 212. The AMF 120 may determine an allowed slice (Allowed NSSAI) based on the UE's 100 requested slice (Requested NSSAI), UE subscription slice (Subscribed S-NSSAI), the UE access network (3GPP AN), and/or the operator policy. For example, the AMF 120 may include the UE's 100 requested slice (e.g., S-NSSAI A) in the allowed slice (e.g., S-NSSAI A).

In an embodiment of the disclosure, when the registration request message includes the preferred access type set by the UE 100, the AMF 120 may store the preferred access type. The preferred access type may be stored in the AMF 120 in a UE context.

In another embodiment of the disclosure, the AMF 120 may obtain the preferred access type information for the S-NSSAI from an NF (e.g., a UDM, a PCF, an NWDAF, an NSSF, a UDR, an NRF, or the like) of the 5G core network (or at least one network function in the 5G core network). When the NF is a UDM, the UDM may transmit to the AMF 120 the preferred access type as part of the UE subscription data. When the NF is a PCF, the PCF may transmit to the AMF 120 the preferred access type as part of the policy information (e.g., AM policy, UE policy, SM policy, or the like). The AMF 120 may store the preferred access type received from the NF. The preferred access type may be stored in the AMF 120 in a UE context.

In another embodiment of the disclosure, the AMF 120 may determine the preferred access type for the S-NSSAI based on the operator policy (or local configuration, local policy, or the like). The AMF 120 may store the preferred access type according to the operator policy. For example, when the preferred access type information is not provided by the UE 100, i.e., the preferred access type is not included in the registration request message, the AMF 120 may use a default value according to the operator policy for the preferred access type. The preferred access type may be stored in the AMF 120 in a UE context. Alternatively, the preferred access type may have a value that is applied to any UE without being limited to a particular UE.

In operation 216, the AMF 120 may check with the NF 200 of the 5G core network for slice availability before confirming allowance of the allowed slice to the UE 100. For this, the AMF 120 may transmit a slice availability request message to the NF 200. The slice availability request message may include at least one of target slice information (e.g., S-NSSAI, Requested NSSAI, Allowed NSSAI, Subscribed S-NSSAI, or the like), the UE's access network information (e.g., 3GP, non-3GPP, or the like), UE location information (e.g., tracking area (TA)), or UE information (e.g., subscription permanent identifier (SUPI), 5G globally unique temporary identifier (5G-GUTI), or the like).

In operation 218, the NF 200 may check a slice policy for a target slice (e.g., S-NSSAI, Requested NSSAI, Allowed NSSAI, Subscribed S-NSSAI, or the like) received from the AMF 120 and the number of UEs currently accessing the target slice.

For example, the NF 200 may compare the maximum number of UEs included in the slice policy for the target slice with the number of UEs currently accessing the target slice, and determine that the target slice is currently available when the number of UEs currently accessing the target slice does not reach the maximum number of UEs. When the target slice is currently available, the NF 200 may increment the number of UEs currently accessing the target slice by one based on the request message in the operation 216. The NF 200 may store at least one of slice information (S-NSSAI), information about the UE 100 that is using the slice (e.g., UE identity (ID)), or access network information working with the slice (e.g., 3GPP, non-3GPP, or the like), to manage the number of UEs. When the UE 100 is using (or registers with) S-NSSAI through a 3GPP access network, the number of UEs currently accessing the target slice may be computed to be one.

In another example, the NF 200 may compare the maximum number of UEs included in the slice policy for the target slice with the number of UEs currently accessing the target slice, and determine the target slice is not currently available when the number of UEs currently accessing the target slice reaches the maximum number of UEs.

In operation 220, the NF 200 may transmit a slice availability response message to the AMF 120. The slice availability response message may include at least one of target slice information (e.g., S-NSSAI, Requested NSSAI, Allowed NSSAI, Subscribed S-NSSAI, or the like), whether the target slice is available or not (e.g., an indicator indicating whether the target slice is available or unavailable), or information relating to unavailability of the target slice (e.g., a cause value, back-off time, etc.) when the target slice is unavailable. When the target slice is unavailable, a rejection cause value responsible for the unavailability may indicate the maximum number of registrations being reached (e.g., quota overflow or excess of the quota). When the target slice is unavailable, back-off time involved with the target slice may indicate that the unavailable slice may not be requested again for the back-off time.

The AMF 120 may confirm the allowed slice according to whether the slice is available or not, which is received from the NF 200. For example, when receiving from the NF 200 that the slice (S-NSSAI) is available, the AMF 120 may include the slice (S-NSSAI) in the allowed slice. In another example, when the NF 200 transmits a message indicating that the slice (S-NSSAI) is unavailable, the AMF 120 may not include the slice (S-NSSAI) in the allowed slice but in the rejected slice (rejected NSSAI).

In operation 222, the AMF 120 may transmit a response message (registration accept or registration reject message) to the UE 100 in response to the registration request message received in operation 214. The registration accept message may include at least one of the allowed slice (Allowed NSSAI) or the rejected slice (Rejected NSSAI). When there is no available slice to the UE 100 at all, the AMF 120 may transmit the registration reject message. When the slice (S-NSSAI) is unavailable, the AMF 120 may add at least one of a cause value for the rejected S-NSSAI or the back-off time to the registration accept or registration reject message.

In operation 224, the RAN 110 may forward to the UE 100 the registration accept or registration reject message received from the AMF 120.

In operation 240, the UE 100 may access the N3IWF 115 and transmit a registration request message. The registration request message may include information about a requested slice (Requested NSSAI, e.g., S-NSSAI A) that the UE 100 tries to use. The S-NSSAI included in the requested slice in the operation 240 may be the same as the S-NSSAI included in the requested slice in the operation 210.

The registration request message transmitted by the UE 100 may include information about a preferred access type.

The preferred access type may indicate a type of an access network preferred by the UE 100 (e.g., the 3GPP access network, the non-3GPP access network, or the like) for the S-NSSAI requested by the UE 100.

In an embodiment of the disclosure, the preferred access type may be set up in association with the RAN 110 currently accessed by the UE 100. In this case, the UE 100 may set an access network type supported by the RAN 115 currently accessed by the UE 100 to be the preferred access type.

In another example, the preferred access type may be set up without regard to the RAN 110 currently accessed by the UE 100. In this case, the UE 100 may set an access network type that is supported or not supported by the RAN 115 currently accessed by the UE 100 to be the preferred access type.

In an embodiment of the disclosure, when the preferred access type for the S-NSSAI is included in the registration request message in the operation 210, the registration request message in the operation 240 may not include the preferred access type. Or, when the UE 100 wants to change the preferred access type for the S-NSSAI included in the registration request message in the operation 210, the UE 100 may add a changed/updated preferred access type to the registration request message in the operation 240. For example, the preferred access type for the S-NSSAI indicates a 3GPP access network in the operation 210, and it is changed to a non-3GPP access network in the operation 240.

In operation 242, the N3IWF 115 that receives the registration request message may select the AMF 120 to forward the registration request to, based on the Requested NSSAI and/or UE ID (e.g., 5G-GUTI) received from the UE 100. For example, the N3IWF 115 may select the AMF 120 indicated by the UE ID (e.g., 5G-GUTI).

In operation 244, the N3IWF 115 may forward the registration request message to the AMF 120 selected in the operation 242. The AMF 120 may determine an allowed slice (Allowed NSSAI) based on the UE's 100 requested slice (Requested NSSAI), UE subscription slice (Subscribed S-NSSAI), the UE access network (non-3GPP AN), and/or the operator policy. In determining the allowed slice, the AMF 120 may consider the allowed slice and/or rejected slice determined in the operations 210 to 224. For example, the AMF 120 may include the UE's 100 requested slice (e.g., S-NSSAI A) in the allowed slice (e.g., S-NSSAI A).

In an embodiment of the disclosure, when the registration request message includes the preferred access type set by the UE 100, the AMF 120 may store the preferred access type. For example, when the preferred access type for the S-NSSAI is not present in the UE context, the AMF 120 may store the preferred access type. Otherwise, when the preferred access type for the S-NSSAI is present in the UE context, the AMF 120 may update the preferred access type that has been stored in the AMF 120 with newly received preferred access type information.

In another embodiment of the disclosure, the AMF 120 may obtain the preferred access type information for the S-NSSAI from an NF (e.g., a UDM, a PCF, an NWDAF, an NSSF, a UDR, an NRF, or the like) of the 5G core network (or at least one network function in the 5G core network). When the NF is a UDM, the UDM may transmit to the AMF 120 the preferred access type as part of the UE subscription data. When the NF is a PCF, the PCF may transmit to the AMF 120 the preferred access type as part of the policy information (e.g., AM policy, UE policy, SM policy, or the like). The AMF 120 may store the preferred access type received from the NF. The preferred access type may be stored in the AMF 120 in a UE context.

In another embodiment of the disclosure, the AMF 120 may determine the preferred access type for the S-NSSAI based on the operator policy (or local configuration, local policy, or the like). The AMF 120 may store the preferred access type according to the operator policy. For example, when the preferred access type information is not provided by the UE 100, i.e., the preferred access type is not included in the registration request message, the AMF 120 may use a default value according to the operator policy for the preferred access type. The preferred access type may be stored in the AMF 120 in a UE context. Alternatively, the preferred access type may have a value that is applied to any UE without being limited to a particular UE.

In operation 246, in a case that the UE counting method is on a registration basis, the AMF 120 may check with the NF 200 of the 5G core network for slice availability before confirming allowance of an allowed slice to the UE 100, based on the maximum UE counting method included in the policy information. For this, the AMF 120 may transmit a slice availability request message to the NF 200. The slice availability request message may include at least one of target slice information (e.g., S-NSSAI, Requested NSSAI, Allowed NSSAI, Subscribed S-NSSAI, or the like), the UE's access network information (e.g., 3GP, non-3GPP, or the like), UE location information (e.g., tracking area (TA)), or UE information (e.g., subscription permanent identifier (SUPI), 5G globally unique temporary identifier (5G-GUTI), or the like).

In operation 248, the NF 200 may check a slice policy for a target slice (e.g., S-NSSAI, Requested NSSAI, Allowed NSSAI, Subscribed S-NSSAI, or the like) received from the AMF 120 and the number of UEs currently accessing the target slice.

For example, the NF 200 may compare the maximum number of UEs included in the slice policy for the target slice with the number of UEs currently accessing the target slice, and determine the target slice is currently available when the number of UEs currently accessing the target slice does not reach the maximum number of UEs. When the target slice is currently available, the NF 200 may increment the number of UEs currently accessing the target slice by one based on the request message in the operation 216. The NF 200 may store at least one of slice information (S-NSSAI), information about the UE 100 that is using the slice (e.g., UE identity (ID)), or access network information working with the slice (e.g., 3GPP, non-3GPP, or the like), to manage the number of UEs. When the UE 100 is using (or registers with) S-NSSAI through both the 3GPP access network and the non-3GPP access network, the number of UEs currently accessing the target slice may be computed to be two.

In another example, the NF 200 may compare the maximum number of UEs included in the slice policy for the target slice with the number of UEs currently accessing the target slice, and determine the target slice is not currently available when the number of UEs currently accessing the target slice reaches the maximum number of UEs.

In operation 250, the NF 200 may transmit a slice availability response message to the AMF 120. The slice availability response message may include at least one of target slice information (e.g., S-NSSAI, Requested NSSAI, Allowed NSSAI, Subscribed S-NSSAI, or the like), whether the target slice is available or not (e.g., an indicator indicating whether the target slice is available or unavailable), or information relating to unavailability of the target slice (e.g., a cause value, back-off time, etc.) when the target slice is unavailable. When the target slice is unavailable, a rejection cause value responsible for the unavailability may indicate the maximum number of registrations being reached (e.g., quota overflow or excess of the quota). When the target slice is unavailable, back-off time involved with the target slice may indicate that the unavailable slice may not be requested again for the back-off time.

The AMF 120 may confirm the allowed slice according to whether the slice is available or not, which is received from the NF 200. For example, when receiving from the NF 200 that the slice (S-NSSAI) is available, the AMF 120 may include the slice (S-NSSAI) in the allowed slice. In another example, when the NF 200 transmits a message indicating that the slice (S-NSSAI) is unavailable, the AMF 120 may not include the slice (S-NSSAI) in the allowed slice but in the rejected slice (rejected NSSAI).

In operation 252, the AMF 120 may transmit a response message (registration accept or registration reject message) to the UE 100 in response to the registration request message received in operation 244. The registration accept message may include at least one of the allowed slice (Allowed NSSAI) or the rejected slice (Rejected NSSAI). When there is no available slice to the UE 100 at all, the AMF 120 may transmit the registration reject message. When the slice (S-NSSAI) is unavailable, the AMF 120 may add at least one of a cause value for the rejected S-NSSAI or the back-off time to the registration accept or registration reject message.

In operation 254, the RAN 110 may forward to the UE 100 the registration accept or registration reject message received from the AMF 120.

In an embodiment of the disclosure, the NF 200 may determine slice availability for each registration of the UE. Accordingly, even when the UE 100 requests the same slice (e.g., S-NSSAI A) in the operations 210 and 240, availability of the slice may be different depending on when the operation 218 or 248 occurs. For example, the NF 200 determines that the slice (e.g., S-NSSAI A) is available in the operation 218, but determines that the same slice (S-NSSAI A) is unavailable in the operation 248. Accordingly, the AMF 120 may transmit the slice (S-NSSAI A) as the allowed NSSAI to the UE 100 in the registration accept message transmitted in operation 222. On the other hand, the AMF 120 may transmit the slice (S-NSSAI A) as the rejected NSSAI to the UE 100 in the registration accept message transmitted in operation 252.

It is shown in FIG. 2 that the 3GPP access network registration procedure and the non-3GPP access network registration procedure are sequentially performed, but in another embodiment of the disclosure, the non-3GPP access network registration procedure is performed and followed by the 3GPP access network registration procedure.

In FIG. 2, the NF 200 may be an NF of the 5G core network (or at least one network function in the 5G core network). For example, of the NFs of the 5G core network, the NF 200 may be the PCF 140, the NSSF 160, or the UDM 145. It is, however, an example, and the NF 200 of FIG. 2 may be supported by the AMF 120 among the NFs of the 5G core network. In this case, the operations 216 to 220 and 246 to 250 may be handled by internal operations of the AMF 120 without need for an extra procedure.

In an embodiment of the disclosure, in the procedures shown in FIGS. 2 to 5, the UE may receive rejected S-NSSAI, a cause value of the rejected S-NSSAI, back-off time, etc., from an NF (e.g., the AMF) of the 5G core network (or at least one network function in the 5G core network). The cause value of the rejected S-NSSAI corresponds to the maximum number of registrations/UEs being reached (e.g., quota overflow, excess of the quota, etc.), the UE may apply the back-off time of the rejected S-NSSAI to a PLMN engaged with the rejected S-NSSAI. In this case, the UE may apply the back-off time of the rejected S-NSSAI not only to an access network through which the back-off time is received but also any access network of the same PLMN. For example, when the UE 100 receives the rejected S-NSSAI, the cause value and back-off time of the rejected S-NSSAI through the RAN 110 in operation 224, the UE 100 may not request the same S-NSSAI through the RAN 110 nor through the non-3GPP access network 115 until as much time as the back-off time has elapsed. The UE 100 may add the rejected S-NSSAI received in the operation 224 as requested S-NSSAI to the registration request message transmitted in operation 210 or 240 after the lapse of the back-off time.

In an embodiment of the disclosure, the 5G system may set priorities of access networks. For example, an NF of the 5G core network (or at least one network function in the 5G core network) may determine a priority of each network based on information (e.g., the preferred access type for the S-NSSAI) received from the UE during the registration procedure as shown in FIG. 2. In another example, an NF of the 5G core network (or at least one network function in the 5G core network) may determine a priority of each network based on information (e.g., the UE subscription data, the policy information, etc.) received from another NF during the registration procedure as shown in FIG. 2. In still another example, the mobile communication operator may set the priority of the 3GPP access network over the non-3GPP access network based on the mobile communication operator policy. In yet another example, the mobile communication operator may set the priority of the non-3GPP access network over the 3GPP access network. The priorities of access networks may be stored in the NF (e.g., PCF NSSF, UDM, or the like) of the 5G core network in the operator policy. Alternatively, the priorities of access networks may be stored in the slice policy information as follows:

S-NSSAI
maximum number of UEs
maximum UE counting method
priorities of access networks Network operation for allocation of an allowed slice when access networks are prioritized will now be described in connection with FIGS. 3 and 4.

Figure 3:
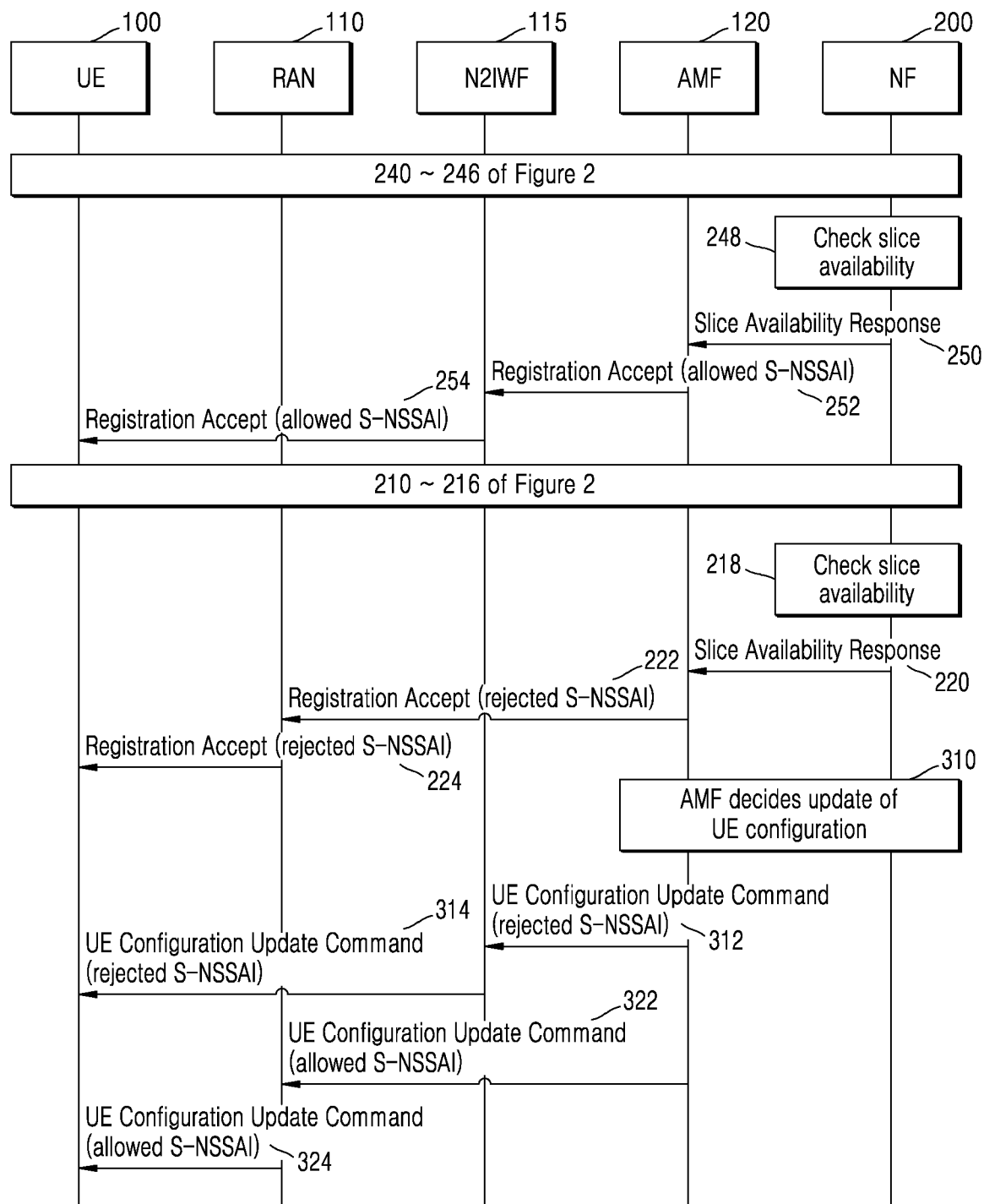
FIG. 3 is a sequence diagram illustrating an allowed slice switching procedure when access networks are prioritized, according to an embodiment of the disclosure.

FIG. 3 is a sequence diagram illustrating an allowed slice switching procedure when access networks are prioritized, according to an embodiment of the disclosure.

Referring to FIG. 3, the NF 200 may allow the UE 100 connected through the non-3GPP access network to use the slice (allowed NSSAI, e.g., S-NSSAI A) requested by the UE 100 while operations 240 to 254 of FIG. 2 are performed. The UE 100 may establish a protocol data unit (PDU) session using the slice (e.g., S-NSAID A) in the non-3GPP network such as Wi-Fi. Furthermore, the NF 200 may reject the UE 100 connected through the 3GPP access network for the slice (rejected NSSAI, e.g., S-NSSAI A) requested by the UE 100 while operations 210 to 224 are performed. The UE 100 may not establish a PDU session using the slice (e.g., S-NSSAI A) in the 3GPP network.

In an embodiment of the disclosure, the NF 200 may apply an access network priority policy. For example, according to the access network priority policy, the priority of the 3GPP access network may be set over the non-3GPP access network. The NF 200 may determine to allocate a slice (e.g., S-NSSAI A) allocated for registration via the non-3GPP access network for registration via the 3GPP access network. Accordingly, the NF 200 may start a UE configuration update procedure in operation 310. The UE configuration update procedure may be used to change the allowed slice and/or the rejected slice for the UE.

In another embodiment of the disclosure, the AMF 120 may determine based on the information received from the NF 200 that the slice requested by the UE connected through the 3GPP access network is unavailable, while the operations 210 to 224 of FIG. 2 are performed. In this case, the AMF 120 may determine priorities of access networks based on the preferred access type. The preferred access type may be received from the UE 100.

The AMF 120 may determine whether the access network that performs the operations 210 to 224 has priority over the other access network for the currently unavailable slice (S-NSSAI) requested by the UE, based on the preferred access type information. When the access network (e.g., of an access network type supported by the RAN 110) that performs the operations 210 to 224 has priority over the other access network (of an access network type supported by the N3IWF 115), the AMF 120 may determine to allocate the slice (e.g., S-NSSAI A) allocated for registration via the non-3GPP access network of the UE 100 for registration via the 3GPP access network in operation 252. Accordingly, the AMF 120 may start the UE configuration update procedure in operation 310. The UE configuration update procedure may be used to change the allowed slice and/or the rejected slice for the UE.

In operation 312, the AMF 120 may transmit a UE configuration update command to the UE 100 that accesses the N3IWF 115. The UE configuration update command may include information indicating that the allowed S-NSSAI (e.g., S-NSSAI A) allowed in the operation 252 is now unavailable, i.e., rejected S-NSSAI (e.g., S-NSSAI A). The UE configuration update command may also include a cause value of the rejected S-NSSAI, back-off timer, etc.

In operation 314, the N3IWF 115 may forward the received UE configuration update command to the UE 100. Upon reception of the UE configuration update command, the UE 100 may confirm from the rejected S-NSSAI (e.g., S-NSSAI A) included in the UE configuration update command that the slice (S-NSSAI A) is unavailable in the non-3GPP access network.

In operation 322, the AMF 120 may transmit a UE configuration update command to the UE 100 that accesses the RAN 110. The UE configuration update command may include information indicating that the rejected S-NSSAI (e.g., S-NSSAI A) rejected in the operation 222 is now available, i.e., the UE configuration update command may include allowed S-NSSAI (e.g., S-NSSAI A).

In operation 324, the RAN 110 may forward the received UE configuration update command to the UE 100. Upon reception of the UE configuration update command, the UE 100 may confirm from the allowed S-NSSAI (e.g., S-NSSAI A) included in the UE configuration update command that the slice (S-NSSAI A) is available in the 3GPP access network.

Although it is illustrated that the operations 312 to 314 and 322 to 324 are sequentially performed, the operations 322 to 324 may be performed earlier than the operations 312 to 314.

Figure 4:
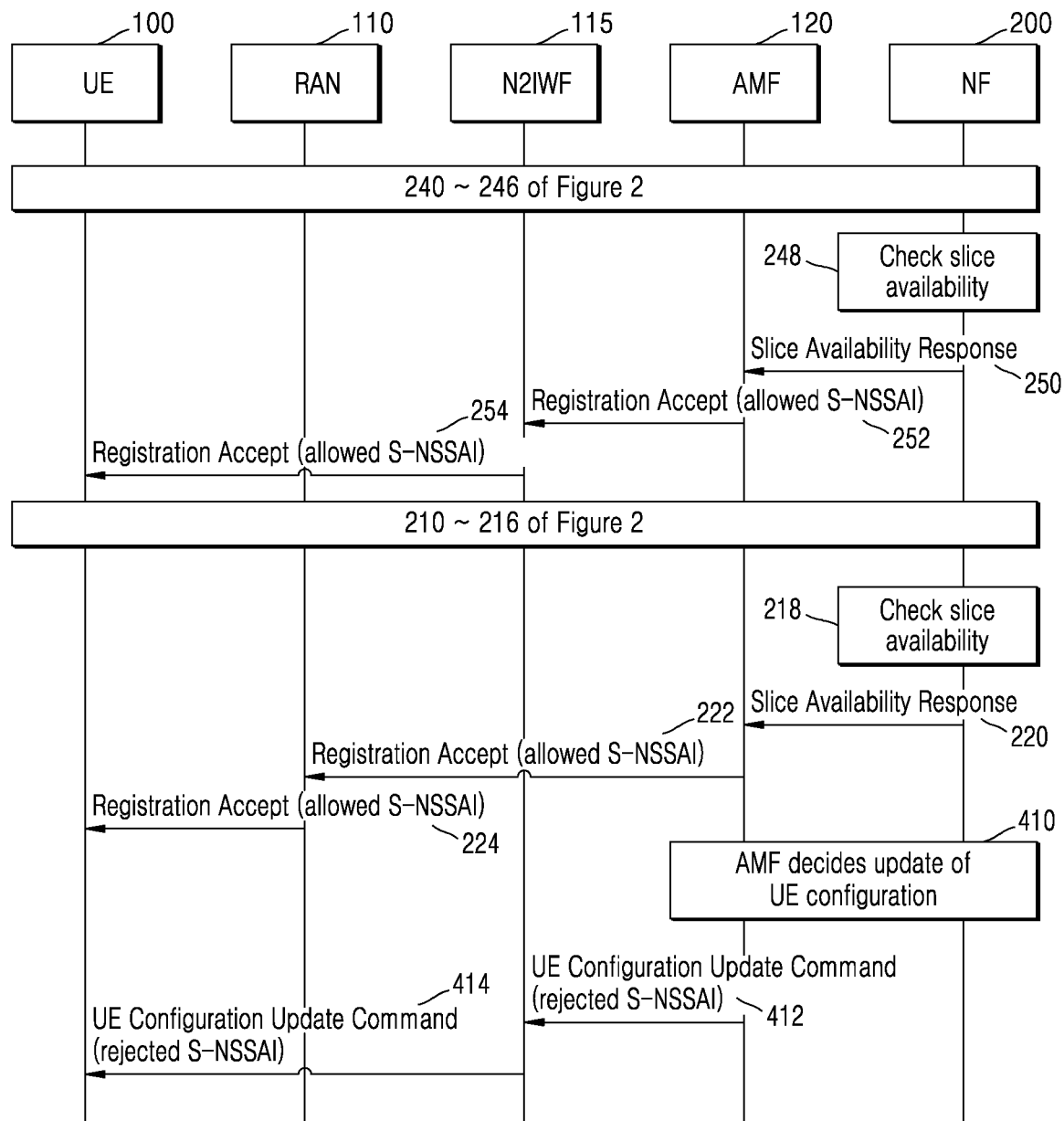
FIG. 4 is a sequence diagram illustrating another available slice switching procedure, according to an embodiment of the disclosure.

FIG. 4 is a sequence diagram illustrating another available slice switching procedure, according to an embodiment of the disclosure.

Referring to FIG. 4, the NF 200 may allow the UE 100 connected through the non-3GPP access network to use the slice (allowed NSSAI, e.g., S-NSSAI A) requested by the UE 100 while operations 240 to 254 of FIG. 2 are performed. The UE 100 may establish a PDU session using the slice (e.g., S-NSSAI A) in the non-3GPP network such as Wi-Fi.

The NF 200 may determine that the slice requested by the UE connected through the 3GPP access network is now unavailable, while the operations 210 to 224 of FIG. 2 are performed. In this case, the NF 200 may apply an access network priority policy. For example, according to the access network priority policy, the priority of the 3GPP access network may be set over the non-3GPP access network.

The NF 200 may determine to allocate a slice (e.g., S-NSSAI A) allocated in operation 250 for registration via the non-3GPP access network for registration via the 3GPP access network. Accordingly, the NF 200 may indicate in the slice availability response message of the operation 220 that the slice is available. The AMF 120 may allow the UE 200 to use the slice requested by the UE 100 (allowed NSSAI, e.g., S-NSSAI A) in a registration accept message in operation 222, based on the information received from the NF 200. The UE 100 may establish a PDU session using the slice (e.g., S-NSSAI A) in the 3GPP network.

As the slice requested by the UE 100 is not available but yet allowed to be used in the 3GPP access network in the operation 218, the NF 200 may need to change availability of the slice transmitted in the operation 250 into unavailable, in operation 410. Accordingly, the NF 200 may start a UE configuration update procedure in the operation 410. The UE configuration update procedure may be used to change the allowed slice and/or the rejected slice for the UE.

In another embodiment of the disclosure, the AMF 120 may determine based on the information received from the NF 200 that the slice requested by the UE connected through the 3GPP access network is unavailable, while the operations 210 to 224 of FIG. 2 are performed. In this case, the AMF 120 may determine priorities of access networks based on the preferred access type. The preferred access type may be received from the UE 100.

The AMF 120 may determine whether the access network that performs the operations 210 to 224 has priority over the other access network for the currently unavailable slice (S-NSSAI) requested by the UE 100, based on the preferred access type information. When the access network (e.g., of an access network type supported by the RAN 110) that performs the operations 210 to 224 has priority over the other access network (of an access network type supported by the N3IWF 115), the AMF 120 may determine to allocate the slice (e.g., S-NSSAI A) allocated for registration via the non-3GPP access network of the UE 100 for registration via the 3GPP access network in operation 252. Accordingly, the AMF 120 may allow through the registration accept message in the operation 222 for the UE 100 to use the currently unavailable slice (S-NSSAI) requested by the UE 100, i.e., the S-NSSAI is included in the Allowed NSSAI. Upon reception of the registration accept message including the allowed NSSAI in the operation 224, the UE 100 may use the slice (e.g., S-NSSAI A) in the 3GPP network. For example, the UE 100 may establish a PDU session using the slice (e.g., S-NSSAI A).

As the slice requested by the UE 100 is not available but yet allowed to be used in the 3GPP access network in the operation 222, the AMF 120 may need to change the availability of the slice (S-NSSAI included in the allowed NSSAI) transmitted in the operation 252 into unavailable (rejected S-NSSAI), in operation 410. Accordingly, the AMF 120 may start the UE configuration update procedure in the operation 410. The UE configuration update procedure may be used to change the allowed slice and/or the rejected slice for the UE.

In operation 412, the AMF 120 may transmit a UE configuration update command to the UE 100 that accesses the N3IWF 115. The UE configuration update command may include information indicating that the allowed S-NSSAI (e.g., S-NSSAI A) allowed in the operation 252 is now unavailable, i.e., rejected S-NSSAI (e.g., S-NSSAI A). The UE configuration update command may also include a cause value of the rejected S-NSSAI, back-off timer, etc.

In operation 414, the N3IWF 115 may forward the received UE configuration update command to the UE 100. Upon reception of the UE configuration update command, the UE 100 may determine from the rejected S-NSSAI (e.g., S-NSSAI A) included in the UE configuration update command that the slice (S-NSSAI A) is unavailable in the non-3GPP access network.

The 5G system in an embodiment of the disclosure may use the procedures shown in FIGS. 3 and 4 to allocate a network slice for a registration request through an access network with higher priority.

Embodiment 3

Figure 5:
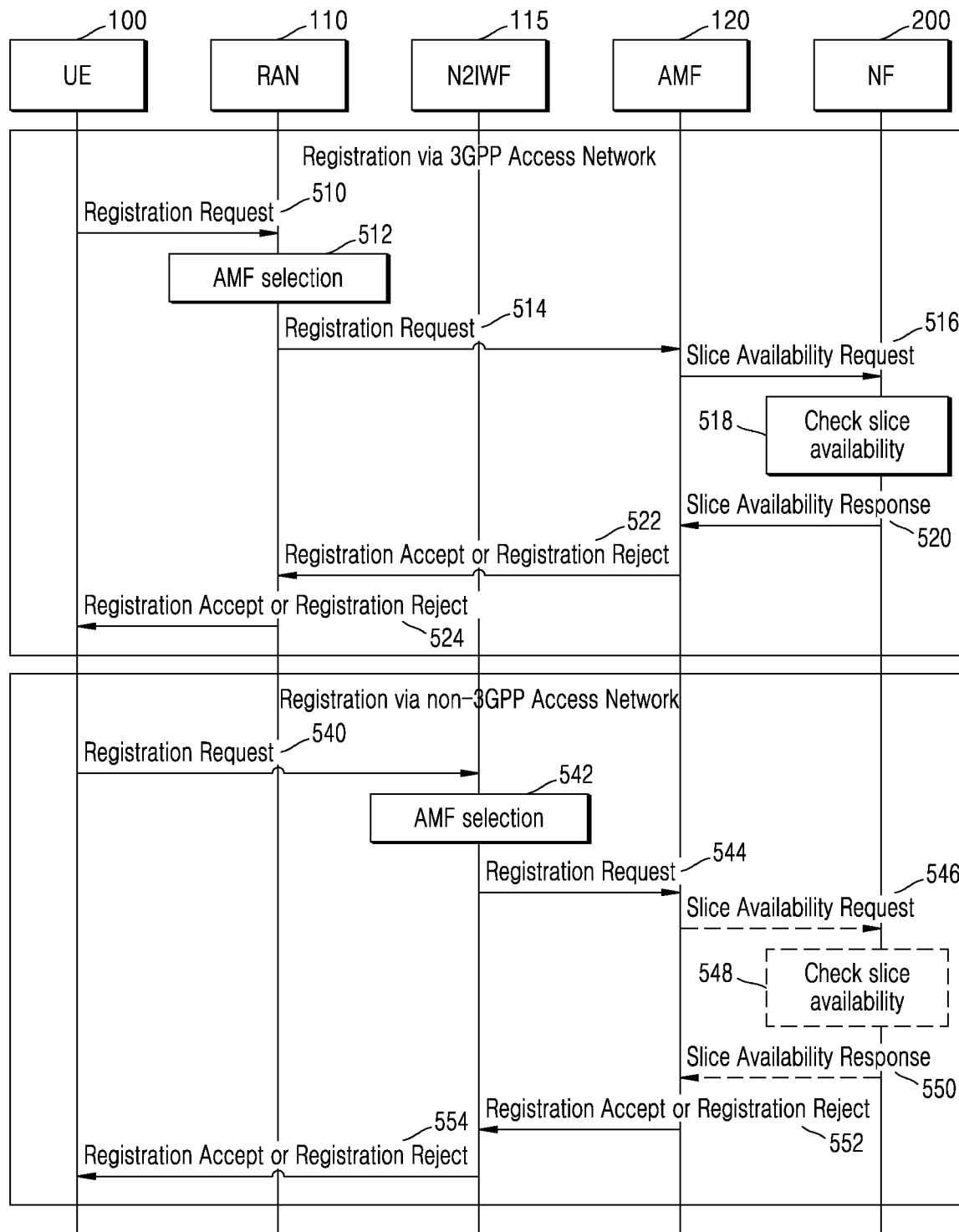
FIG. 5 is a sequence diagram illustrating a UE registration procedure, according to another embodiment of the disclosure.

FIG. 5 is a sequence diagram illustrating a UE registration procedure, according to an embodiment of the disclosure.

Referring to FIG. 5, the UE 100 may access the RAN 110 and the N3IWF 115 to perform a registration procedure with the AMF 120.

In operation 510, the UE 100 may access the RAN 110 and transmit a registration request message. The registration request message may include information about a requested slice (Requested NSSAI, e.g., S-NSSAI A) that the UE 100 tries to use.

In operation 512, the RAN 110 that has received the registration request message may select the AMF 120 to forward the registration request to, based on the Requested NSSAI received from the UE 100. For example, the AMF 120 selected by the RAN 110 is able to support the Requested NSSAI.

In operation 514, the RAN 110 may forward the registration request message to the AMF 120 selected in the operation 212. The AMF 120 may determine an allowed slice (Allowed NSSAI) based on the UE's 100 requested slice (Requested NSSAI), UE subscription slice (Subscribed S-NSSAI), the UE access network (3GPP AN), and/or the operator policy. For example, the AMF 120 may include the UE's 100 requested slice (e.g., S-NSSAI A) in the allowed slice (e.g., S-NSSAI A).

In operation 516, the AMF 120 may check with the NF 200 of the 5G core network for slice availability before confirming allowance of the allowed slice to the UE 100. For this, the AMF 120 may transmit a slice availability request message to the NF 200. The slice availability request message may include at least one of target slice information (e.g., S-NSSAI, Requested NSSAI, Allowed NSSAI, Subscribed S-NSSAI, or the like), the UE's access network information (e.g., 3GP, non-3GPP, or the like), UE location information (e.g., tracking area (TA)), or UE information (e.g., subscription permanent identifier (SUPI), 5G globally unique temporary identifier (5G-GUTI), or the like).

In operation 518, the NF 200 may check a slice policy for a target slice (e.g., S-NSSAI, Requested NSSAI, Allowed NSSAI, Subscribed S-NSSAI, or the like) received from the AMF 120 and the number of UEs currently accessing the target slice.

For example, the NF 200 may compare the maximum number of UEs included in the slice policy for the target slice with the number of UEs currently accessing the target slice, and determine the target slice is currently available slice when the number of UEs currently accessing the target slice does not reach the maximum number of UEs. When the target slice is currently available, the NF 200 may increment the number of UEs currently accessing the target slice by one based on the request message in the operation 216. The NF 200 may store at least one of slice information (S-NSSAI), information about the UE 100 that is using the slice (e.g., UE identity (ID)), or access network information working with the slice (e.g., 3GPP, non-3GPP, or the like), to manage the number of UEs. When the UE 100 is using (or registers with) S-NSSAI through a 3GPP access network, the number of UEs currently accessing the target slice may be computed to be one.

In another example, the NF 200 may compare the maximum number of UEs included in the slice policy for the target slice with the number of UEs currently accessing the target slice, and determine the target slice is not currently available when the number of UEs currently accessing the target slice reaches the maximum number of UEs.

In operation 520, the NF 200 may transmit a slice availability response message to the AMF 120. The slice availability response message may include at least one of target slice information (e.g., S-NSSAI, Requested NSSAI, Allowed NSSAI, Subscribed S-NSSAI, or the like), whether the target slice is available or not (e.g., an indicator indicating whether the target slice is available or unavailable), or information relating to unavailability of the target slice (e.g., a cause value, back-off time, etc.) when the target slice is unavailable. When the target slice is unavailable, a rejection cause value responsible for the unavailability may indicate the maximum number of registrations being reached (e.g., quota overflow or excess of the quota). When the target slice is unavailable, back-off time involved with the target slice may indicate that the unavailable slice may not be requested again for the back-off time.

The AMF 120 may confirm the allowed slice according to whether the slice is available or not, which is received from the NF 200. For example, when receiving from the NF 200 a message indicating that the slice (S-NSSAI) is available, the AMF 120 may include the slice (S-NSSAI) in the allowed slice. Or, when receiving from the NF 200 a message indicating that the slice (S-NSSAI) is unavailable, the AMF 120 may not include the slice (S-NSSAI) in the allowed slice but in the rejected slice (rejected NSSAI).

In operation 522, the AMF 120 may transmit a response message (registration accept or registration reject message) to the UE 100 in response to the registration request message received in operation 214. The registration accept message may include at least one of the allowed slice (Allowed NSSAI) or the rejected slice (Rejected NSSAI). When there is no available slice to the UE 100 at all, the AMF 120 may transmit the registration reject message. When the slice (S-NSSAI) is unavailable, the AMF 120 may add at least one of a cause value for the rejected S-NSSAI or the back-off time to the registration accept or registration reject message.

In operation 524, the RAN 110 may forward to the UE 100 the registration accept or registration reject message received from the AMF 120.

In operation 540, the UE 100 may access the N3IWF 115 and transmit a registration request message. The registration request message may include information about a requested slice (Requested NSSAI, e.g., S-NSSAI A) that the UE 100 tries to use. The S-NSSAI included in the requested slice in the operation 540 may be the same as the S-NSSAI included in the requested slice in the operation 510.

In operation 542, the N3IWF 115 that receives the registration request message may select the AMF 120 to forward the registration request to, based on the Requested NSSAI and/or UE ID (e.g., 5G-GUTI) received from the UE 100. For example, the N3IWF 115 may select the AMF 120 indicated by the UE ID (e.g., 5G-GUTI).

In operation 544, the N3IWF 115 may forward the registration request message to the AMF 120 selected in the operation 242. The AMF 120 may determine an allowed slice (Allowed NSSAI) based on the UE's 100 requested slice (Requested NSSAI), UE subscription slice (Subscribed S-NSSAI), the UE access network (non-3GPP AN), and/or the operator policy. In determining the allowed slice, the AMF 120 may consider the allowed slice and/or rejected slice determined in the operations 510 to 524. For example, the AMF 120 may include the UE's 100 requested slice (e.g., S-NSSAI A) in the allowed slice (e.g., S-NSSAI A).

In operation 546, based on a maximum UE counting method included in the policy information, the AMF 120 may omit operations 546 to 550 when the UE counting method is on the UE basis. The AMF 120 may determine to add the slice requested by the UE 100 to the allowed slice for the UE 100 based on the information received from the NF 200 in the operation 520.

In another example, the AMF 120 may check with the NF 200 of the 5G core network for slice availability before confirming allowance of the allowed slice to the UE 100. For this, the AMF 120 may transmit a slice availability request message to the NF 200 by performing operations 546 to 550. The slice availability request message may include at least one of target slice information (e.g., S-NSSAI, Requested NSSAI, Allowed NSSAI, Subscribed S-NSSAI, or the like), the UE's access network information (e.g., 3GP, non-3GPP, or the like), UE location information (e.g., tracking area (TA)), or UE information (e.g., subscription permanent identifier (SUPI), 5G globally unique temporary identifier (5G-GUTI), or the like).

In operation 548, the NF 200 may check a slice policy for a target slice (e.g., S-NSSAI, Requested NSSAI, Allowed NSSAI, Subscribed S-NSSAI, or the like) received from the AMF 120 and the number of UEs currently accessing the target slice.

For example, in a case that the UE counting method included in the policy information is on the UE basis, the NF 200 may determine whether to allow the slice for the UE 100 in the non-3GPP access network, based on the information received in the operation 546 and the information determined in the operation 518. As the target slice is allowed for the UE 100 to use it in the 3GPP access network in the operation 518, it may also be allowed for the UE 100 to use it in the non-3GPP access network in the operation 548. The NF 200 may store at least one of slice information (S-NSSAI), information about the UE 100 that is using the slice (e.g., UE identity (ID)), or access network information working with the slice (e.g., 3GPP, non-3GPP, or the like), to manage the number of UEs. When the UE 100 is using (or registers with) S-NSSAI through both the 3GPP access network and the non-3GPP access network, the target slice is being used by one UE, so the number of UEs currently accessing the target slice may be computed to be one.

In operation 550, the NF 200 may transmit a slice availability response message to the AMF 120. The slice availability response message may include at least one of target slice information (e.g., S-NSSAI, Requested NSSAI, Allowed NSSAI, Subscribed S-NSSAI, or the like), whether the target slice is available or not (e.g., an indicator indicating whether the target slice is available or unavailable), or information relating to unavailability of the target slice (e.g., a cause value, back-off time, etc.) when the target slice is unavailable. When the target slice is unavailable, a rejection cause value responsible for the unavailability may indicate the maximum number of registrations being reached (e.g., quota overflow or excess of the quota). When the target slice is unavailable, back-off time involved with the target slice may indicate that the unavailable slice may not be requested again for the back-off time.

The AMF 120 may confirm the allowed slice according to whether the slice is available or not, which is received from the NF 200. For example, when receiving from the NF 200 that the slice (S-NSSAI) is available, the AMF 120 may include the slice (S-NSSAI) in the allowed slice. In another example, when the NF 200 transmits a message indicating that the slice (S-NSSAI) is unavailable, the AMF 120 may not add the slice (S-NSSAI) to the allowed slice but to the rejected slice (rejected NSSAI).

In operation 552, the AMF 120 may transmit a response message (registration accept or registration reject message) to the UE 100 in response to the registration request message received in operation 554. The registration accept message may include at least one of the allowed slice (Allowed NSSAI) or the rejected slice (Rejected NSSAI). When there is no available slice to the UE 100 at all, the AMF 120 may transmit the registration reject message. When the slice (S-NSSAI) is unavailable, the AMF 120 may add at least one of a cause value for the rejected S-NSSAI or the back-off time to the registration accept or registration reject message.

In operation 554, the RAN 110 may forward to the UE 100 the registration accept or registration reject message received from the AMF 120.

With the procedures shown in FIG. 5, the UE 100 may use the same network slice in both the 3GPP access network and the non-3GPP access network.

It is shown in FIG. 5 that the 3GPP access network registration procedure and the non-3GPP access network registration procedure are sequentially performed, but in another embodiment of the disclosure, the non-3GPP access network registration procedure is performed and followed by the 3GPP access network registration procedure.

In FIG. 5, the NF 200 may be an NF of the 5G core network (or at least one network function in the 5G core network). For example, of the NFs of the 5G core network, the NF 200 may be the PCF 140, the NSSF 160, or the UDM 145. It is, however, an example, and the NF 200 of FIG. 5 may be supported by the AMF 120 among the NFs of the 5G core network. In this case, the operations 516 to 520 and 546 to 550 may be handled by internal operations of the AMF 120 without need for an extra procedure.

In an embodiment of the disclosure, in the procedures shown in FIGS. 2 to 5, the UE may receive rejected S-NSSAI, a cause value of the rejected S-NSSAI, back-off time, etc., from an NF (e.g., the AMF) of the 5G core network (or at least one network function in the 5G core network). The cause value of the rejected S-NSSAI corresponds to the maximum number of registrations/UEs being reached (e.g., quota overflow, excess of the quota, etc.), the UE may apply the back-off time of the rejected S-NSSAI to a PLMN engaged with the rejected S-NSSAI. In this case, the UE may apply the back-off time of the rejected S-NSSAI not only to an access network through which the back-off time is received but also any access network of the same PLMN. Specifically, for example, when the UE 100 receives the rejected S-NSSAI, the cause value and back-off time of the rejected S-NSSAI through the RAN 110 in operation 524, the UE 100 may not request the same S-NSSAI through the RAN 110 nor through the N3GPP access network 115 until as much time as the back-off time has elapsed. The UE 100 may add the rejected S-NSSAI received in the operation 524 as requested S-NSSAI to the registration request message transmitted in operation 510 or 540 after the lapse of the back-off time.

Figure 6:
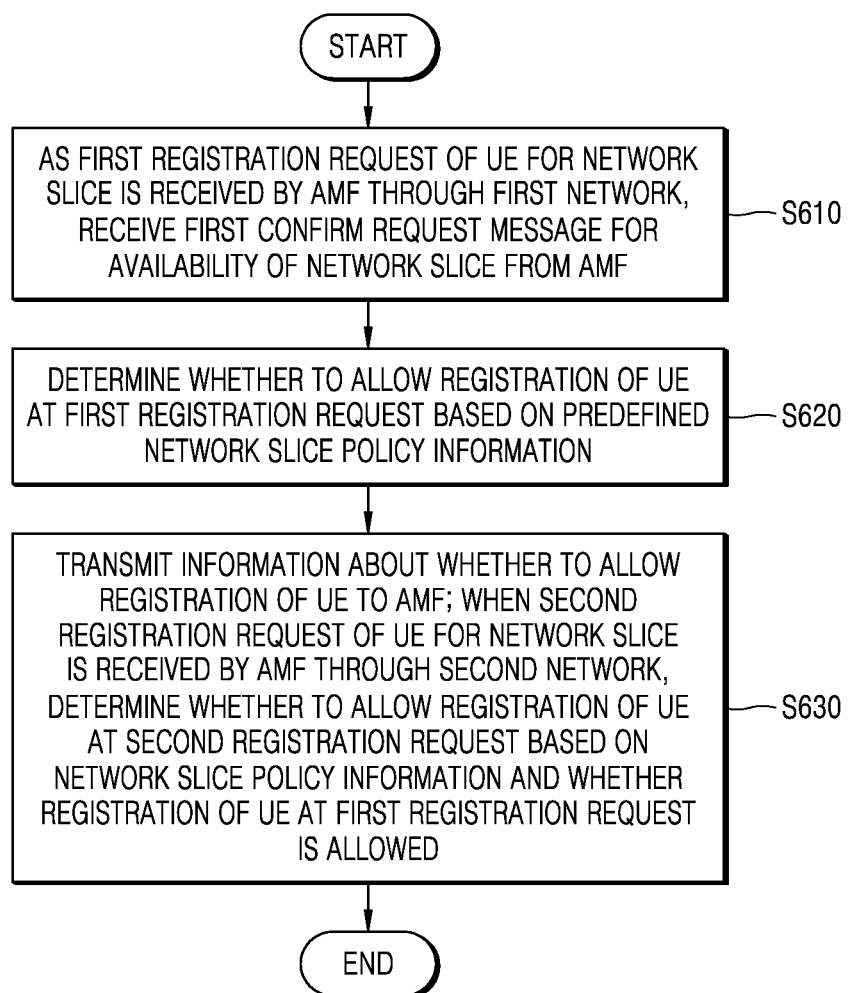
FIG. 6 is a flowchart for describing operation of a network function (NF), according to an embodiment of the disclosure.

FIG. 6 is a flowchart for describing operation of an NF, according to an embodiment of the disclosure.

In operation 610, as a first registration request of a UE for a network slice is received by an AMF through a first network, an NF may receive a first confirm request message for availability of the network slice from the AMF.

In operation 620, the NF may determine whether to allow registration of the UE at the first registration request, based on predefined network slice policy information. The predefined network slice policy information may include, for example, information about the maximum number of registered UEs allowable for the network slice.

In an embodiment of the disclosure, the NF may compare the number of UEs currently registered with the network slice with the maximum number of UEs allowed to be registered based on the network slice policy. When as a result of the comparing, the number of UEs currently registered is less than the maximum number of UEs allowed to be registered, the NF may allow registration of the UE at the first registration request.

In operation 630, the NF may transmit information about whether the registration of the UE is allowed to the AMF.

In the meantime, in the disclosure, the UE may additionally request registration with the network slice through a second network that is different from the first network. When the additional request for registration with the network slice occurs, whether to allow the registration may be determined based on the network slice policy.

In an embodiment of the disclosure, in a case that the UE counting method is on a registration basis, as the second registration request of the UE is received by the AMF, the NF may receive a second confirm request message for availability of the network slice from the AMF. The NF may determine whether to allow the registration of the UE at the second registration request, based on a result of comparing between the number of UEs registered with the network slice, which is updated as the registration of the UE is allowed at the first registration request, and the number of UEs allowed to be registered with the network slice, which is included in the network slice policy information.

When the number of UEs registered with the network slice is equal to or greater than the number of UEs allowed to be registered with the network slice, the UE may allow the registration of the UE at one of the first registration request and the second registration request based on the priorities of the first and second networks. For example, when the priority of the second network is higher than the priority of the first network, the NF may allow the registration of the UE at the second registration request and determine to release the registration of the UE allowed at the first registration request, which has been allowed earlier. Accordingly, the NF may transmit at least one of a message indicating that the registration of the UE allowed at the first registration request is released or a message indicating that the registration of the UE at the second registration request is allowed. In another example, when the priority of the first network is higher than the priority of the second network, the NF may determine to reject the registration of the UE at the second registration request and transmit a message indicating the rejection.

In another embodiment of the disclosure, in a case that the UE counting method is on the UE basis, whether to allow the registration of the UE at the second registration request may be determined based on whether the registration of the UE is allowed at the first registration request. For example, as the registration of the UE is allowed at the first registration request, the registration of the UE at the second registration request may be allowed.

Figure 7:
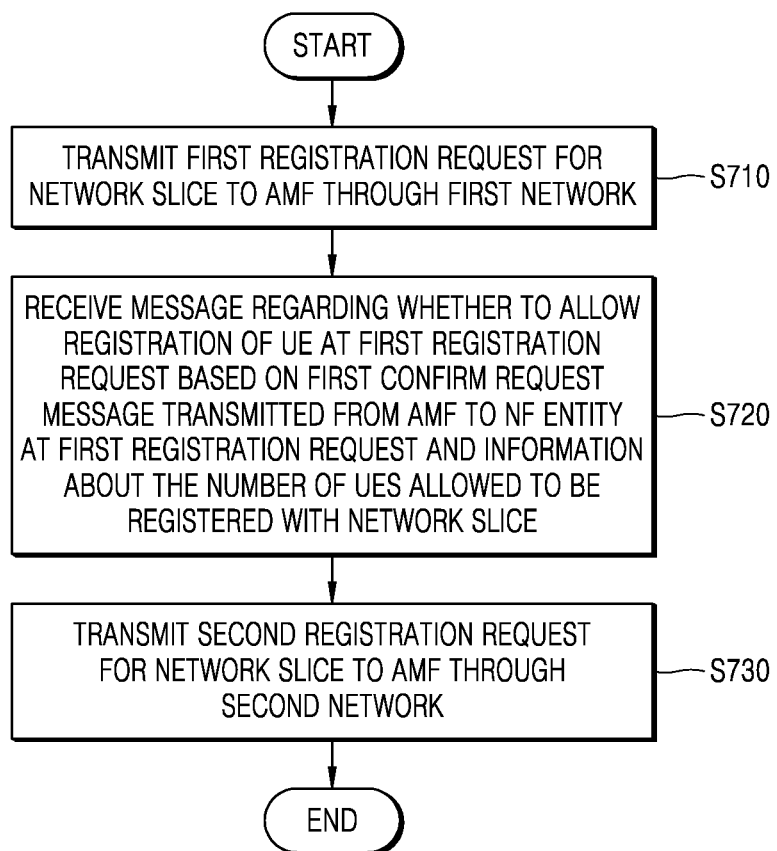
FIG. 7 is a flowchart for describing operation of a UE, according to an embodiment of the disclosure.

FIG. 7 is a flowchart for describing operation of a UE, according to an embodiment of the disclosure.

In operation 710, a UE may transmit a first registration request for a network slice to an AMF through a first network.

In operation 720, the UE may receive a message regarding whether to allow registration of the UE at the first registration request based on a first confirm request message transmitted to an NF from the AMF at the first registration request and predefined network slice policy information.

In operation 730, a UE may transmit a second registration request for a network slice to the AMF through a second network. Whether to allow the registration of the UE at the second registration request may be determined based on the network slice policy information and whether the registration of the UE is allowed at the first registration request. Whether to allow the registration may be determined based on a UE counting method according to the network slice policy, which is described above in the operation 630 of FIG. 6.

Figure 8:
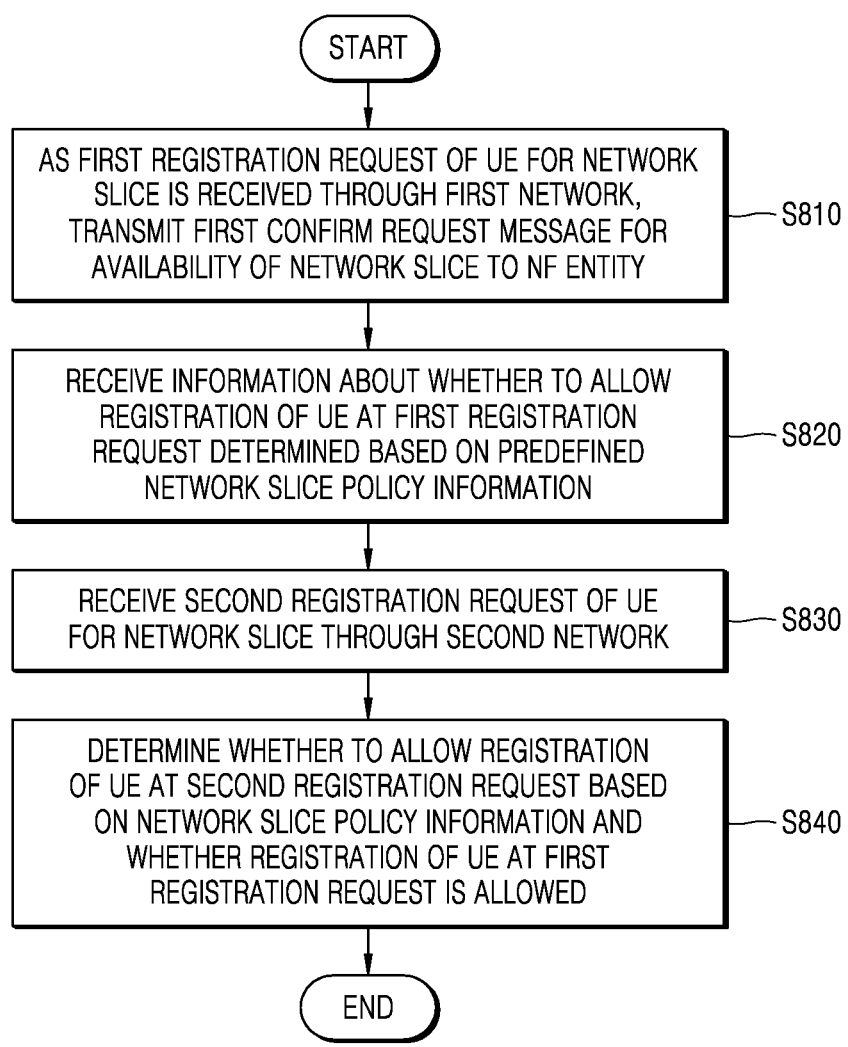
FIG. 8 is a flowchart for describing operation of an access and mobility management function (AMF) when a UE based UE counting method is applied, according to an embodiment of the disclosure.

FIG. 8 is a flowchart for describing operation of an AMF when a UE based UE counting method is applied, according to an embodiment of the disclosure.

In operation 810, as a first registration request of a UE for a network slice is received by an AMF through a first network, a first confirm request message for availability of the network slice may be transmitted to an NF.

In operation 820, the AMF may receive information regarding whether to allow registration of the UE at the first registration request, which is determined based on predefined network slice policy information.

In operation 830, the AMF may receive a second registration request for a network slice through a second network.

In operation 840, the AMF may determine whether to allow the registration of the UE at the second registration request based on the network slice policy information and whether the registration of the UE is allowed at the first registration request. When it is determined based on the network slice policy information that the UE counting method for the network slice is on a UE basis, whether to allow the registration of the UE at the second registration request may be determined based on whether the registration of the UE is allowed at the first registration request. For example, as the registration of the UE is allowed at the first registration request, the registration of the UE at the second registration request may be allowed.

Figure 9:
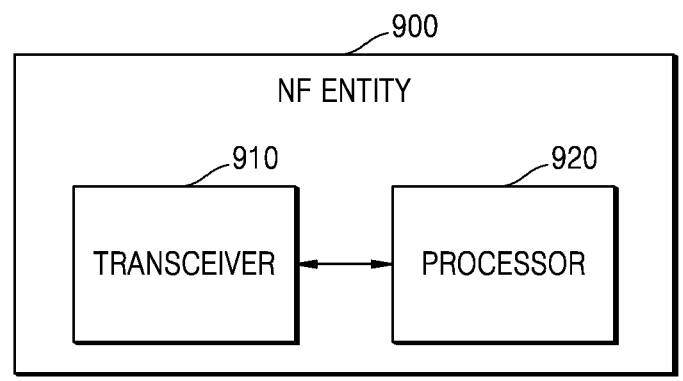
FIG. 9 is a block diagram of an NF entity, according to an embodiment of the disclosure.

FIG. 9 is a block diagram of an NF entity 900, according to an embodiment of the disclosure.

Referring to FIG. 9, the NF entity 900 may include a transceiver 910 and a processor 920. The transceiver 910 may operate in a communication method of the NF entity 900 as described above. Elements of the NF entity 900 are not, however, limited thereto. For example, the NF entity 900 may include more (e.g., a memory) or fewer elements than described above. In another example, referring to FIG.

10, the NF entity 900 may include the processor 920 for controlling operations of a plurality of modules.

The transceiver 910 may transmit or receive signals to or from another NF entity, e.g., an AMF. The signal may include control information and data, including e.g., a confirm request message for availability of a certain slice and a message indicating whether to allow registration of the UE for the certain slice. For signal transmission or reception to or from the other NF entity, the transceiver 910 may include an RF transmitter for up-converting the frequency of a signal to be transmitted and amplifying the signal and an RF receiver for low-noise amplifying a received signal and down-converting the frequency of the received signal. It is merely an example of the transceiver 910, and the elements of the transceiver 910 are not limited to the RF transmitter and RF receiver.

In addition, the transceiver 910 may receive a signal on a wired channel or wireless channel and output the signal to the processor 920, or transmit a signal output from the processor 920 on a wired channel or wireless channel.

A memory (not shown) may store a program and data required for operation of the NF entity 900. Furthermore, the memory may store control information or data included in a signal obtained by the NF entity 900. The memory may include a storage medium such as a read only memory (ROM), a random access memory (RAM), a hard disk, a compact disc ROM (CD-ROM), and a digital versatile disc (DVD), or a combination of storage mediums.

The processor 920 may control a series of processes for the NF entity 900 to operate in accordance with the embodiments of the disclosure. The processor 920 may include a controller or one or more processors.

Figure 10:
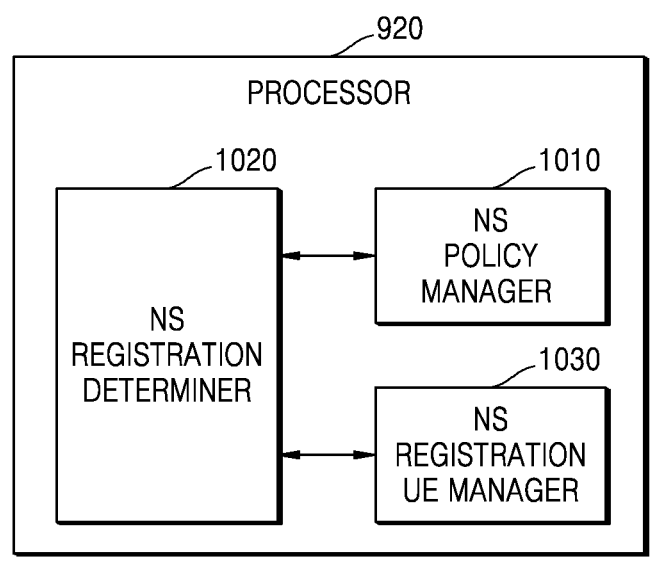
FIG. 10 is a block diagram of a processor of an NF entity, according to an embodiment of the disclosure.

FIG. 10 is a block diagram of a processor of an NF entity, according to an embodiment of the disclosure.

For example, referring to FIG. 10, the processor 920 may include a network slice (NS) policy manager 1010, an NS registration determiner 1020, and an NS registration UE manager 1030. Although each 'unit' (or module, device, or ~er) included in the processor 920 is shown as an independent device form in this embodiment of the disclosure, it is an example and the NS policy manager 1010, the NS registration determiner 1020, and the NS registration UE manager 1030 may be implemented in software.

The NS policy manager 1010 may manage information about S-NSSAI, the maximum number of UEs allowed to be registered with the network slice, and the maximum UE counting method for the network slice. The maximum UE counting method for the network slice may include a registration based counting method and a UE based counting method, as described above in connection with FIGS. 2 to 5.

As the first registration request of the UE for the network slice is received by the AMF through the first network, the NS registration determiner 1020 may confirm availability of the network slice based on the first confirm request message received from the AMF. Specifically, the NS registration determiner 1020 may determine whether to allow registration of the UE at the first registration request, based on network slice policy information obtained from the NS policy manager 1010.

Figure 11:
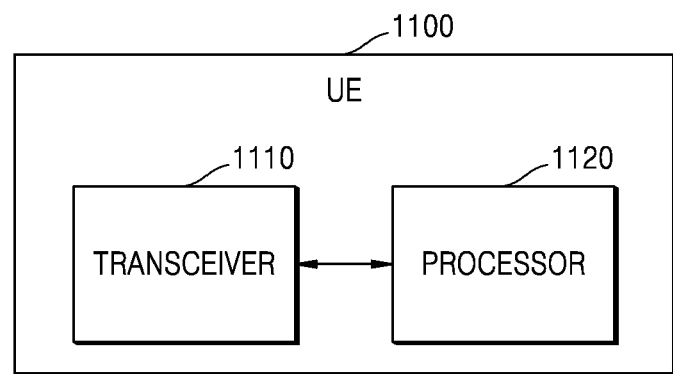
FIG. 11 is a block diagram of a UE, according to an embodiment of the disclosure.

The NS registration UE manager 1030 may update information of UEs registered with the network slice. For example, when a second registration request of the UE subsequent to the first registration request is additionally received by the AMF through a second network, availability of the network slice may need to be confirmed based on the first confirm request message received from the AMF. In this case, when the number of UEs registered with the network slice is equal to or greater than the number of UEs allowed to be registered with the network slice, and the priority of the second network is higher than the priority of the first network, the NS registration UE manager 1030 may release the existing registration of the UE at the first registration request and update the information of UEs to indicate that registration of the UE at the second registration request is allowed. FIG. 11 is a block diagram of a UE, according to an embodiment of the disclosure.

Referring to FIG. 11, a UE 1100 may include a transceiver 1110 and a processor 1120. The transceiver 1110 may operate in a communication method of the UE 1100 as described above. Elements of the terminal 1100 are not, however, limited thereto. For example, the UE 1100 may include more (e.g., a memory) or fewer elements than described above. In another example, referring to FIG. 12, the UE 1100 may include the processor 1120 for controlling operations of a plurality of modules.

The transceiver 1110 may transmit or receive signals to or from an NF entity, e.g., an AMF. The signal may include control information and data, including e.g., a registration request for a certain slice, and a message indicating whether to allow registration of the UE for the certain slice. For signal transmission or reception to or from the NF entity, the transceiver 1110 may include an RF transmitter for up-converting the frequency of a signal to be transmitted and amplifying the signal and an RF receiver for low-noise amplifying a received signal and down-converting the frequency of the received signal. It is merely an example of the transceiver 1110, and the elements of the transceiver 1110 are not limited to the RF transmitter and RF receiver.

In addition, the transceiver 1110 may receive a signal on a wired channel or wireless channel and output the signal to the processor 1120, or transmit a signal output from the processor 1120 on a wired channel or wireless channel.

A memory (now shown) may store a program and data required for operation of the UE 1100. Furthermore, the memory may store control information or data included in a signal obtained by the UE 1100. The memory may include a storage medium such as a ROM, a RAM, a hard disk, a CD-ROM, and a DVD, or a combination of storage mediums.

The processor 1120 may control a series of processes for the UE 1100 to be operated according to the aforementioned embodiments of the disclosure. The processor 1120 may include a controller or one or more processors.

Figure 12:
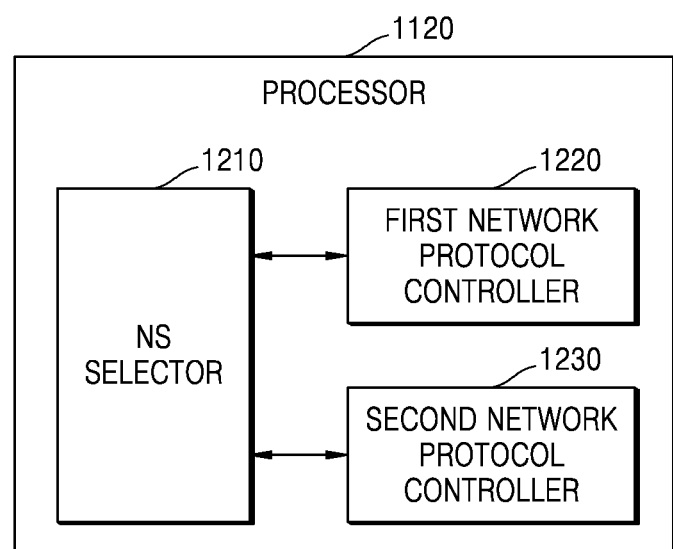
FIG. 12 is a block diagram of a processor of a UE, according to an embodiment of the disclosure.

FIG. 12 is a block diagram of a processor of a UE, according to an embodiment of the disclosure For example, referring to FIG. 12, the processor 1120 may include an NS selector 1210, a first network protocol controller 1220, and a second network protocol controller 1230. Although each 'unit' (or module, device, or ~er) included in the processor 1120 is shown as an independent device form in this embodiment of the disclosure, it is an example and the NS selector 1210, the first network protocol controller 1220, and the second network protocol controller 1230 may be implemented in software.

The NS selector 1210 may select a network slice for which the UE 1100 is going to request for registration, from among a plurality of network slices.

The first network protocol controller 1220 may control a series of processes in which the UE 1100 makes access to a base station (or RAN) through the first network (e.g., a 3GPP access network). The UE 1100 may transmit a first registration request for the selected network slice through the first network.

The second network protocol controller 1230 may control a series of processes in which the UE 1100 makes access to an N3IWF through a second network (e.g., a non-3GPP access network). The UE 1100 may transmit a third registration request for the selected network slice through a third network.

Figure 13:
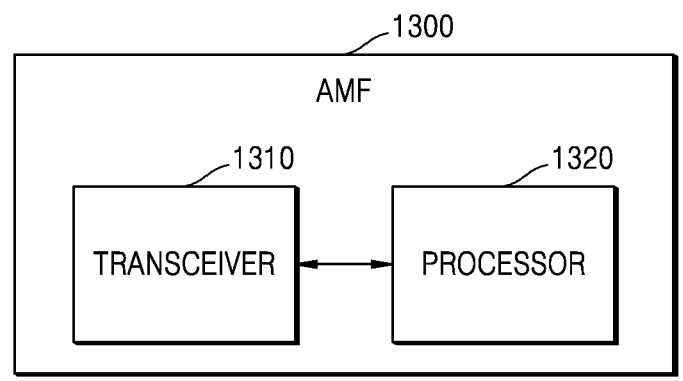
FIG. 13 is a block diagram of an AMF, according to an embodiment of the disclosure.

FIG. 13 is a block diagram of an AMF, according to an embodiment of the disclosure.

Referring to FIG. 13, an AMF 1300 may include a transceiver 1310 and a processor 1320. The transceiver 1310 may operate in a communication method of the AMF 1300 as described above. Elements of the AMF 1300 are not, however, limited thereto. For example, the AMF 1300 may include more (e.g., a memory) or fewer elements than described above. In another example, referring to FIG. 14, the AMF 1300 may include the processor 1320 for controlling operations of a plurality of modules.

The transceiver 1310 may transmit or receive signals to or from another NF entity. The signal may include control information and data, including e.g., a confirm request message for availability of a certain slice and a message indicating whether to allow registration of the UE for the certain slice. For signal transmission or reception to or from the NF entity, the transceiver 1310 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 1310 are not limited to the RF transmitter and RF receiver.

In addition, the transceiver 1310 may receive a signal on a wired channel or wireless channel and output the signal to the processor 1320, or transmit a signal output from the processor 1320 on a wired channel or wireless channel.

A memory (now shown) may store a program and data required for operation of the AMF 1300. Furthermore, the memory may store control information or data included in a signal obtained by the AMF 1300. The memory may include a storage medium such as a ROM, a RAM, a hard disk, a CD-ROM, and a DVD, or a combination of storage mediums.

The processor 1320 may control a series of processes for the AMF 1300 to operate in accordance with the embodiments of the disclosure. The processor 1320 may include a controller or one or more processors.

Figure 14:
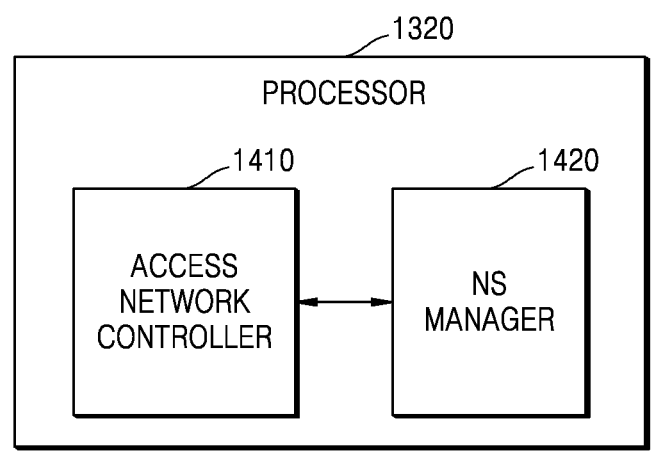
FIG. 14 is a block diagram of a processor of an AMF, according to an embodiment of the disclosure.

FIG. 14 is a block diagram of a processor of an AMF, according to an embodiment of the disclosure.

For example, referring to FIG. 14, the processor 1320 may include an access network controller 1410 and an NS manager 1420. Although each 'unit' (or module, device, or ~er) included in the processor 1320 is shown as an independent device form in this embodiment of the disclosure, it is an example and the access network controller 1410 and the NS manager 1420 may be implemented in software.

The access network controller 1410 may control communication with a RAN or N3IWF that receives a registration request for a network slice from a UE, and process signals transmitted to or received from the RAN or N3IWF through the N2 interface.

The NS manager 1420 may determine an allowed slice (Allowed NSSAI) based on the UE's requested slice (Requested NSSAI), UE subscription slice (Subscribed S-NSSAI), the UE access network (3 GPP AN), and/or an operator policy. The NS manager 1420 may check with an NF entity for availability of a slice.

In embodiments of the disclosure, an apparatus and method of effectively managing UEs trying to use a network slice in a wireless communication system is provided.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a network function (NF) entity performing communication in a wireless communication system, the method comprising:
   receiving a first request message for a network slice, during a first user equipment (UE) registration procedure, from an access and mobility function (AMF) entity, wherein the first request message relates to number of UEs update request message;
   determining whether a number of UEs registered with the network slice is to be updated, based on an access type information for the network slice; and
   transmitting, to the AMF entity, a response message including information indicating whether the number of UEs registered with the network slice reached a maximum number of UEs allowed to be registered with the network slice, in response to receiving the first request message.

2. The method of claim 1, further comprising:
   receiving a second request message for the network slice, during a second UE registration procedure, from the AMF entity, wherein the second request message relates to number of UEs update request message; and
   determining whether the number of UEs registered with the network slice is to be updated in response to receiving the second request message, based on at least one of the access type information for the network slice, the information regarding update of the number of UEs registered with the network slice in response to receiving the first request message, the maximum number of UEs allowed to be registered with the network slice.

3. The method of claim 2, further comprising:
   receiving, from the AMF entity, the information regarding update of the number of UEs registered with the network slice in response to receiving the second request message determined based on at least one of the access type information for the network slice or the information regarding update of the number of UEs registered with the network slice in response to receiving the first request message.

4. A method of a user equipment (UE) performing communication in a wireless communication system, the method comprising:
   transmitting a first registration request of the UE for a network slice to an access and mobility function (AMF) entity through a first network; and
   receiving a first response message including information indicating whether a number of UEs registered with the network slice reached a maximum number of UEs allowed to be registered with the network slice in response to transmitting the first registration request,
   wherein the information indicating whether the number of UEs registered with the network slice is to be updated associated with the first registration request is determined based on an access type information for the network slice.

5. The method of claim 4, further comprising:
transmitting a second registration request of the UE for the network slice to the AMF entity through a second network; and
receiving a second response message including information indicating whether the number of UEs registered with the network slice reached the maximum number of UEs allowed to be registered with the network slice, in response to transmitting the second registration request,
wherein the information indicating whether the number of UEs registered with the network slice is to be updated associated with the second registration request is determined based on at least one of the access type information for the network slice, the information regarding update of the number of UEs registered with the network slice associated with the first registration request, or the maximum number of UEs allowed to be registered with the network slice.

6. The method of claim 5, further comprising:
receiving, from the AMF entity, the information regarding update of the number of UEs registered with the network slice associated with the second registration request determined based on at least one of the access type information for the network slice or the information regarding update of the number of UEs registered with the network slice associated with the first registration request.

7. A network function (NF) entity performing communication in a wireless communication system, the NF entity comprising:
a transceiver; and
at least one processor configured to:
receive, via the transceiver, a first request message for a network slice, during a first user equipment (UE) registration procedure, from an access and mobility function (AMF) entity, wherein the first request message relates to number of UEs update request message,
determine whether a number of UEs registered with the network slice is to be updated, based on an access type information for the network slice, and
transmit, via the transceiver, to the AMF entity, a response message including information indicating whether the number of UEs registered with the network slice has reached a maximum number of UEs allowed to be registered with the network slice, in response to receiving the first request message.

8. The NF entity of claim 7, wherein the at least one processor is further configured to:
receive, via the transceiver, a second request message for the network slice, during a second UE registration procedure, from the AMF entity, wherein the second request message relates to number of UEs update request message, and
determine whether the number of UEs registered with the network slice is to be updated in response to receiving the second request message, based on at least one of the access type information for the network slice, the information regarding update of the number of UEs registered with the network slice in response to receiving the first request message, the maximum number of UEs allowed to be registered with the network slice.

9. The NF entity of claim 8, wherein the at least one processor is further configured to:
receive, via the transceiver, from the AMF entity, the information regarding update of the number of UEs registered with the network slice in response to receiving the second request message determined based on at least one of the access type information for the network slice or the information regarding update of the number of UEs registered with the network slice in response to receiving the first request message.

10. A user equipment (UE) performing communication in a wireless communication system, the UE comprising:
a transceiver; and
at least one processor configured to:
transmit, via the transceiver, a first registration request of the UE for a network slice to an access and mobility function (AMF) entity through a first network, and
receive, via the transceiver, a first response message including information indicating whether a number of UEs registered with the network slice reached a maximum number of UEs allowed to be registered with the network slice in response to transmitting the first registration request,
wherein the information indicating whether the number of UEs registered with the network slice is to be updated associated with the first registration request is determined based on an access type information for the network slice.

11. The UE of claim 10, wherein the at least one processor is further configured to:
transmit, via the transceiver, a second registration request of the UE for the network slice to the AMF entity through a second network, and
receive, via the transceiver, a second response message including information indicating whether the number of UEs registered with the network slice reached the maximum number of UEs allowed to be registered with the network slice, in response to transmitting the second registration request,
wherein the information indicating whether the number of UEs registered with the network slice is to be updated associated with the second registration request is determined based on at least one of the access type information for the network slice, the information regarding update of the number of UEs registered with the network slice associated with the first registration request, or the maximum number of UEs allowed to be registered with the network slice.

12. The UE of claim 11, wherein the at least one processor is further configured to:
receive, via the transceiver, from the AMF entity, the information regarding update of the number of UEs registered with the network slice associated with the second registration request determined based on at least one of the access type information for the network slice or the information regarding update of the number of UEs registered with the network slice associated with the first registration request.

13. A method of an access and mobility function (AMF) entity performing communication in a wireless communication system, the method comprising:
receiving a first registration request for a network slice from a user equipment (UE) through a first network;
transmitting a first request message for the network slice to a network function (NF) entity, wherein the first request message relates to number of UEs update request message; and
receiving, from the NF entity, a response message including information indicating whether a number of UEs registered with the network slice reached a maximum number of UEs allowed to be registered with the network slice, associated with the first registration request, wherein whether the number of UEs registered with the network slice is to be updated associated with the first registration request is determined based on an access type information for the network slice.

14. The method of claim 13, further comprising:

receiving a second registration request for the network slice from the UE through a second network;

transmitting a second request message for the network slice to the NF entity, wherein the second request message relates to number of UEs update request message; and receiving, from the NF entity, a response message including information indicating whether the number of UEs registered with the network slice reached the maximum number of UEs allowed to be registered with the network slice, associated with the second registration request, wherein whether the number of UEs registered with the network slice is to be updated associated with the second registration request is determined based on at least one of the access type information for the network slice, the information regarding update of the number of UEs registered with the network slice associated with the first registration request, or the maximum number of UEs allowed to be registered with the network slice.

15. The method of claim 14, further comprising:

determining whether the number of UEs registered with the network slice is to be updated associated with the second registration request based on at least one of the access type information for the network slice or the information regarding update of the number of UEs registered with the network slice associated with the first registration request.

16. An access and mobility function (AMF) entity performing communication in a wireless communication system, the AMF entity comprising:

a transceiver; and at least one processor configured to:

receive, via the transceiver, a first registration request for a network slice from a user equipment (UE) through a first network, transmit, via the transceiver, a first request message for the network slice to a network function (NF) entity, wherein the first request message relates to number of UEs update request message, and receive, via the transceiver, a response message including information indicating whether a number of UEs registered with the network slice reached a maximum number of UEs allowed to be registered with the network slice, associated with the first registration request, from the NF entity, wherein whether the number of UEs registered with the network slice is to be updated associated with the first registration request is determined based on an access type information for the network slice.

17. The AMF entity of claim 16, wherein the at least one processor is further configured to:

receive, via the transceiver, a second registration request for the network slice from the UE through a second network, transmit, via the transceiver, a second request message for the network slice to the NF entity, wherein the second request message relates to number of UEs update request message, and receive, via the transceiver, a response message including information indicating whether the number of UEs registered with the network slice reached the maximum number of UEs allowed to be registered with the network slice, associated with the second registration request, from the NF entity, wherein whether the number of UEs registered with the network slice is to be updated associated with the second registration request is determined based on at least one of the access type information for the network slice, the information regarding update of the number of UEs registered with the network slice associated with the first registration request, or the maximum number of UEs allowed to be registered with the network slice.

18. The AMF entity of claim 17, wherein the at least one processor is further configured to:

determine whether the number of UEs registered with the network slice is to be updated associated with the second registration request based on at least one of the access type information for the network slice or the information regarding update of the number of UEs registered with the network slice associated with the first registration request.

* * * * *